(12) United States Patent
Broach

(10) Patent No.: US 11,680,715 B1
(45) Date of Patent: Jun. 20, 2023

(54) SERVOCOOL WATER EVAPORATIVE REFRIGERATION CYCLE

(71) Applicant: Michael E. Broach, San Mateo, CA (US)

(72) Inventor: Michael E. Broach, San Mateo, CA (US)

( * ) Notice: Subject to any disclaimer, the term of this patent is extended or adjusted under 35 U.S.C. 154(b) by 0 days.

(21) Appl. No.: 17/191,568

(22) Filed: Mar. 3, 2021

Related U.S. Application Data

(60) Provisional application No. 63/062,133, filed on Aug. 6, 2020.

(51) Int. Cl.
| | | |
|---|---|---|
| *F24F 1/0087* | (2019.01) | |
| *F24F 5/00* | (2006.01) | |
| *F24F 1/0063* | (2019.01) | |
| *F24F 6/04* | (2006.01) | |

(52) U.S. Cl.
CPC .......... *F24F 1/0087* (2019.02); *F24F 1/0063* (2019.02); *F24F 5/0035* (2013.01); *F24F 6/04* (2013.01); *F24F 2006/046* (2013.01)

(58) Field of Classification Search
CPC ...... F24F 1/0087; F24F 5/0035; F24F 1/0063; F24F 6/04; F24F 2006/046
USPC .......................................................... 62/91
See application file for complete search history.

(56) References Cited

U.S. PATENT DOCUMENTS

| | | | | |
|---|---|---|---|---|
| 2,162,158 A | * | 6/1939 | Coey | F24F 5/0035 159/13.4 |
| 3,116,612 A | * | 1/1964 | Pennington | F24F 5/0035 62/93 |
| 4,002,040 A | | 1/1977 | Munters et al. | |
| 4,023,949 A | | 5/1977 | Schlom et al. | |
| 4,090,370 A | | 5/1978 | Vaughan | |
| 4,137,058 A | | 1/1979 | Schlom et al. | |
| 4,156,351 A | | 5/1979 | Schlom et al. | |
| 4,284,128 A | * | 8/1981 | Nelson | F24F 6/04 165/47 |
| 4,380,910 A | * | 4/1983 | Hood | F24F 1/0087 62/304 |
| 4,926,656 A | * | 5/1990 | Hickley | F24F 5/0035 62/304 |
| 5,187,946 A | | 2/1993 | Rotenberg et al. | |
| 6,385,987 B2 | | 5/2002 | Schlom et al. | |

(Continued)

FOREIGN PATENT DOCUMENTS

| | | |
|---|---|---|
| CN | 101672500 A | 3/2010 |
| WO | 2012075656 A1 | 6/2012 |
| WO | 2019025873 A1 | 2/2019 |

OTHER PUBLICATIONS

A.M. Alklaibi, Experimental and theoretical investigation of internal two-stage evaporative cooler, Energy Conversion and Management, vol. 95, (Year: 2015).*

(Continued)

*Primary Examiner* — Steve S Tanenbaum
(74) *Attorney, Agent, or Firm* — Haynes Beffel & Wolfeld LLP; Ernest J. Beffel, Jr.

(57) ABSTRACT

The technology disclosed is a two stage Indirect/Direct Evaporative Cooling (IDEC) cycle whose novel closed loop topology compels system convergence to a stable operating state, wherein air cooling takes place mostly in the indirect stage. The direct stage then serves principally as a water chiller for that process.

24 Claims, 16 Drawing Sheets

(56) References Cited

U.S. PATENT DOCUMENTS

| | | | |
|---|---|---|---|
| 6,422,030 B1* | 7/2002 | Calvert | F24F 5/0035 |
| | | | 62/310 |
| 6,434,963 B1 | 8/2002 | Urch | |
| 7,051,548 B2 | 5/2006 | Pruitt | |
| 7,765,827 B2 | 8/2010 | Schlom et al. | |
| 2006/0000227 A1* | 1/2006 | Hyland | F24F 5/0035 |
| | | | 62/235.1 |
| 2007/0227171 A1* | 10/2007 | McMillan | F24F 5/0035 |
| | | | 62/291 |
| 2011/0126564 A1* | 6/2011 | Anandhakrishnan | F28D 5/00 |
| | | | 62/304 |
| 2014/0190199 A1* | 7/2014 | Park | F24F 3/1405 |
| | | | 62/314 |
| 2019/0120509 A1 | 4/2019 | Seeley et al. | |
| 2019/0186763 A1* | 6/2019 | Reinders | F24F 1/0087 |

OTHER PUBLICATIONS

Evaluation of Advanced Evaporative Cooler Technologies (Report No. 491-04.7), PG&E Customer Energy Management Emerging Technologies Program, Feb. 2004, 39 pages.

\* cited by examiner

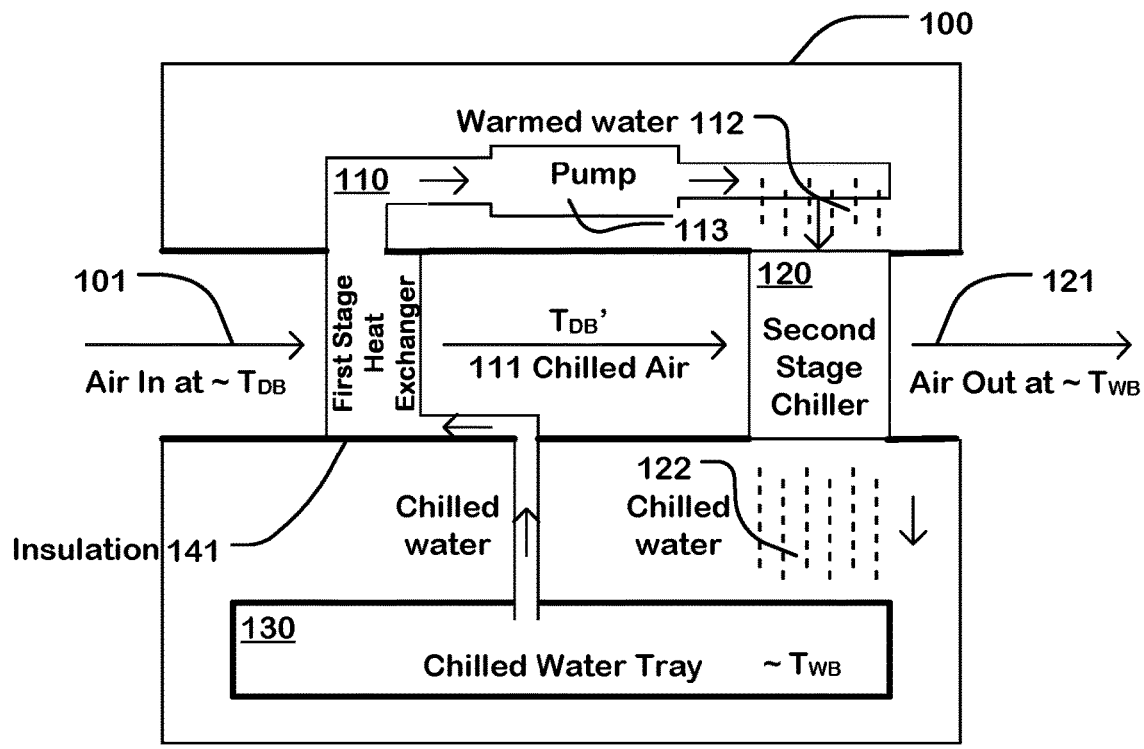
Alternative chilled water tray positions
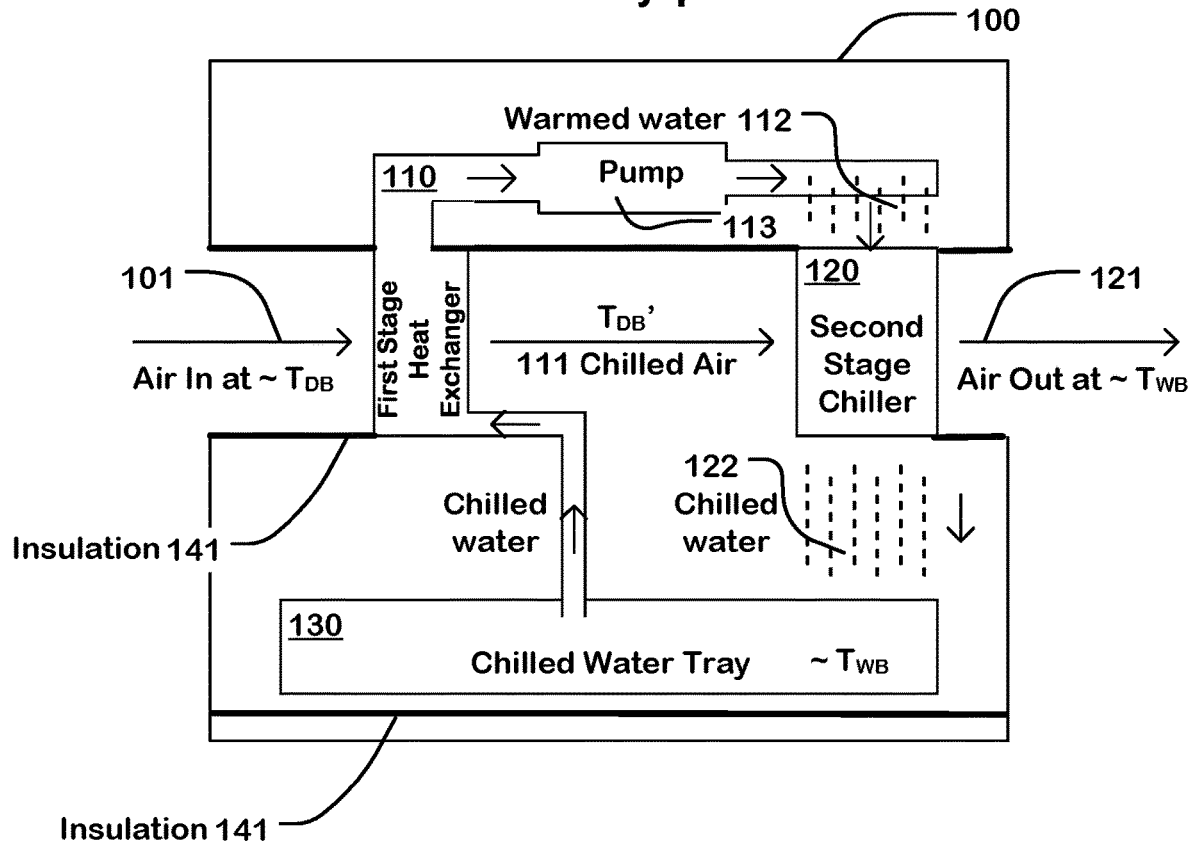
FIG. 1A

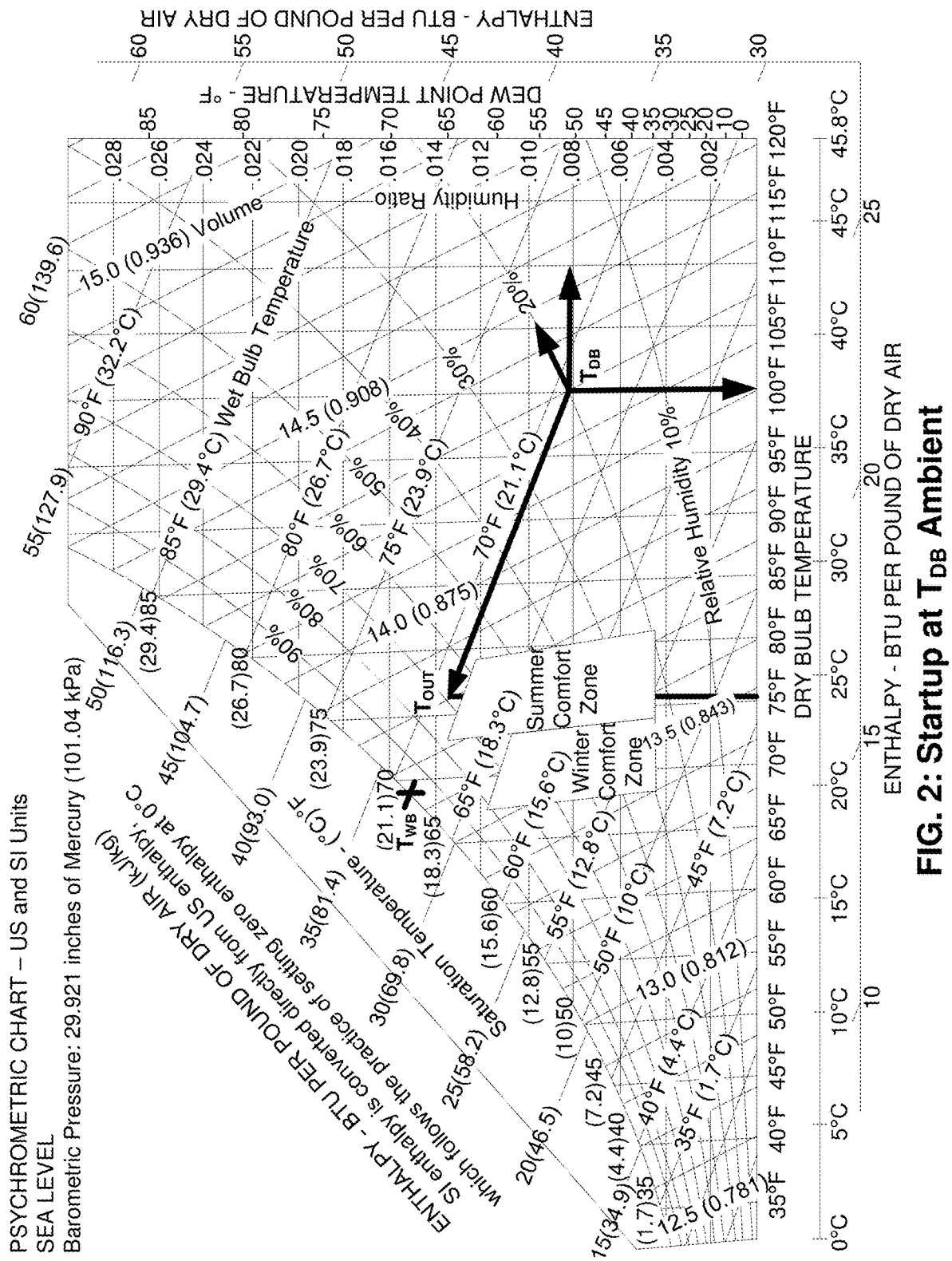
FIG. 2: Startup at $T_{DB}$ Ambient

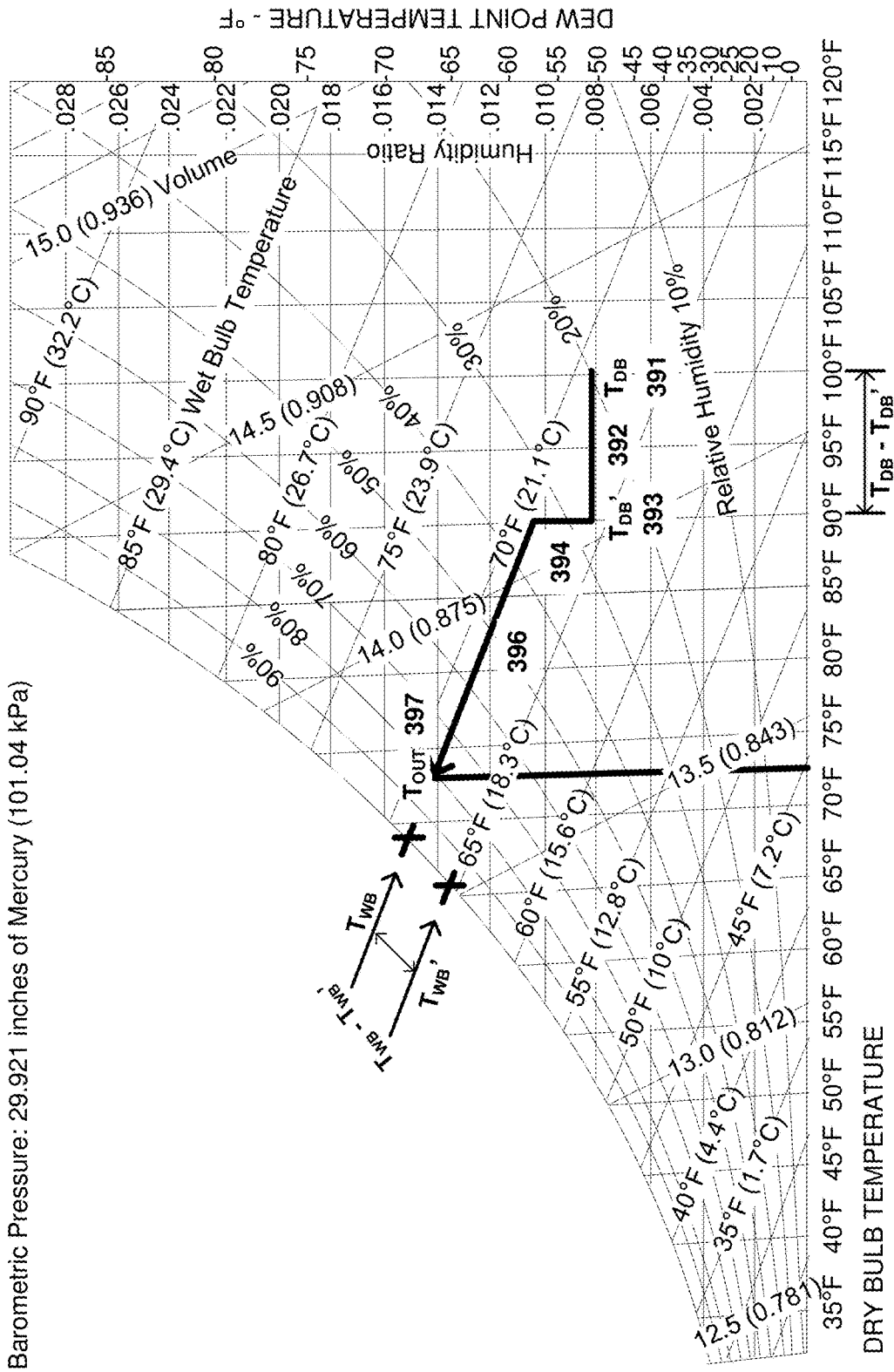
FIG. 3: Some tens of seconds later, $T_{DB} - T_{DB}' = 10^0$ F

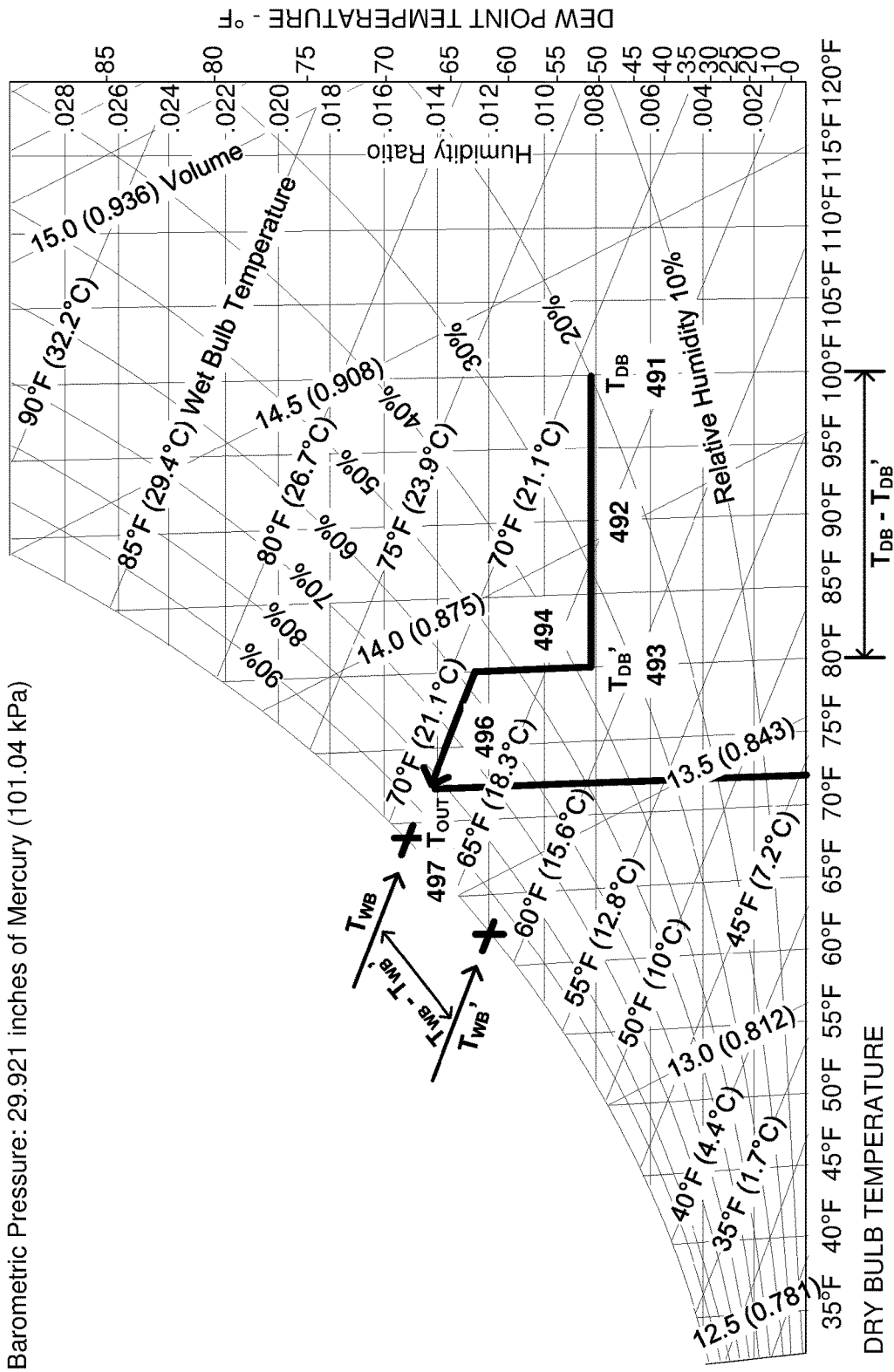
FIG. 4: $T_{DB} - T_{DB}' = 20^0 F$, $T_{WB} - T_{WB}' = 7^0 F$

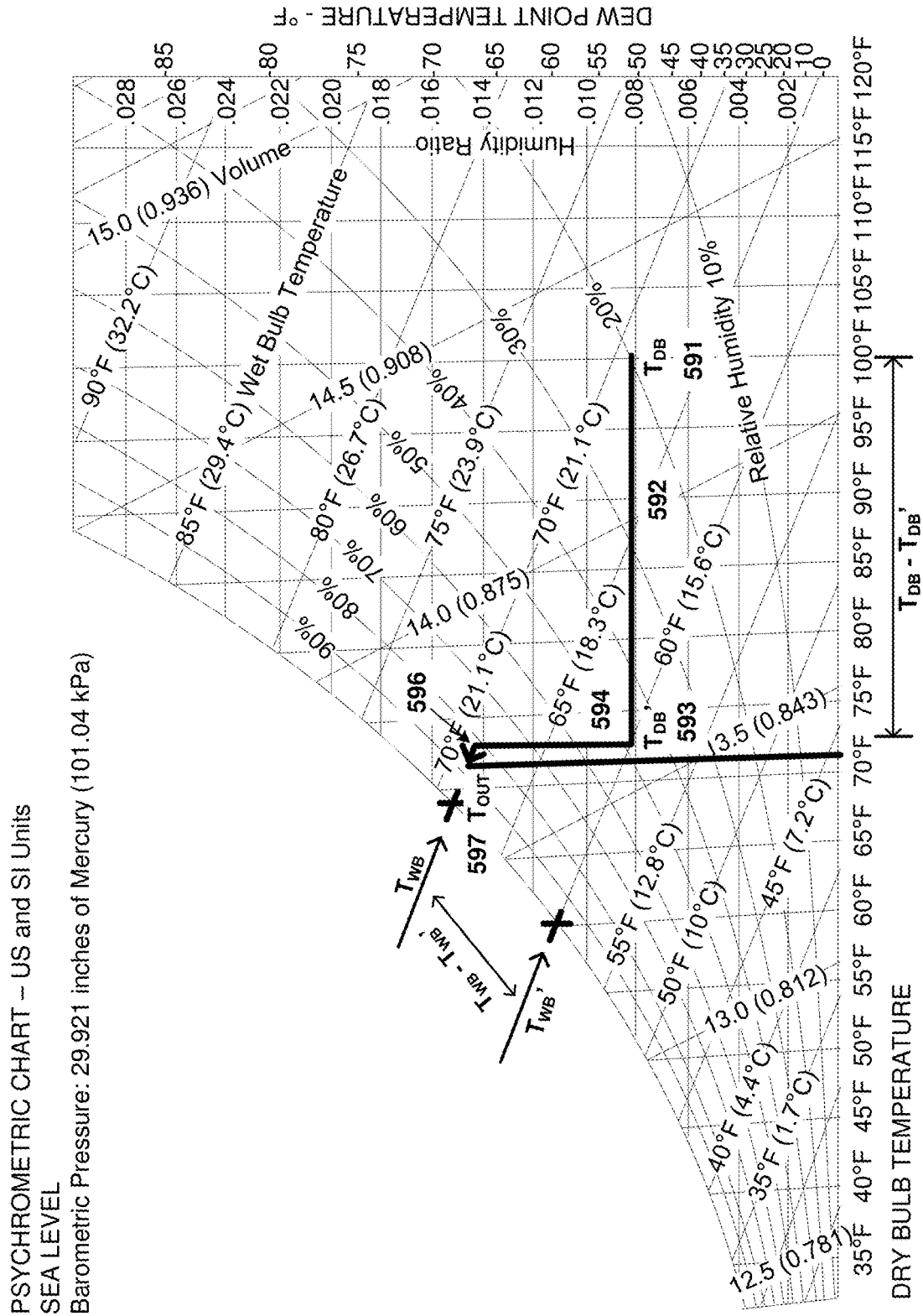
FIG. 5 - Performance Predicted With Medium High Load Factor

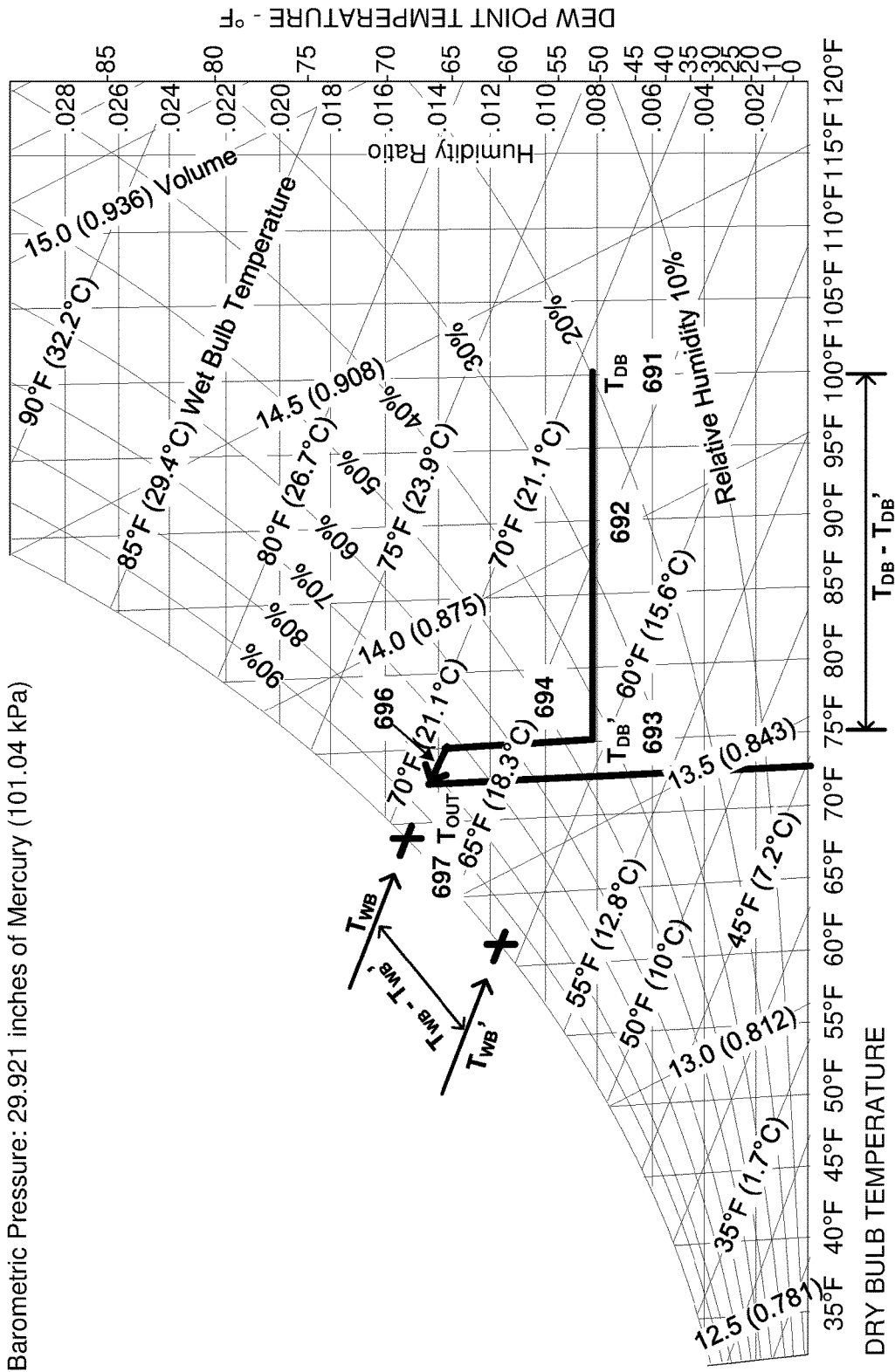
FIG. 6 - Performance Predicted With High Load Factor

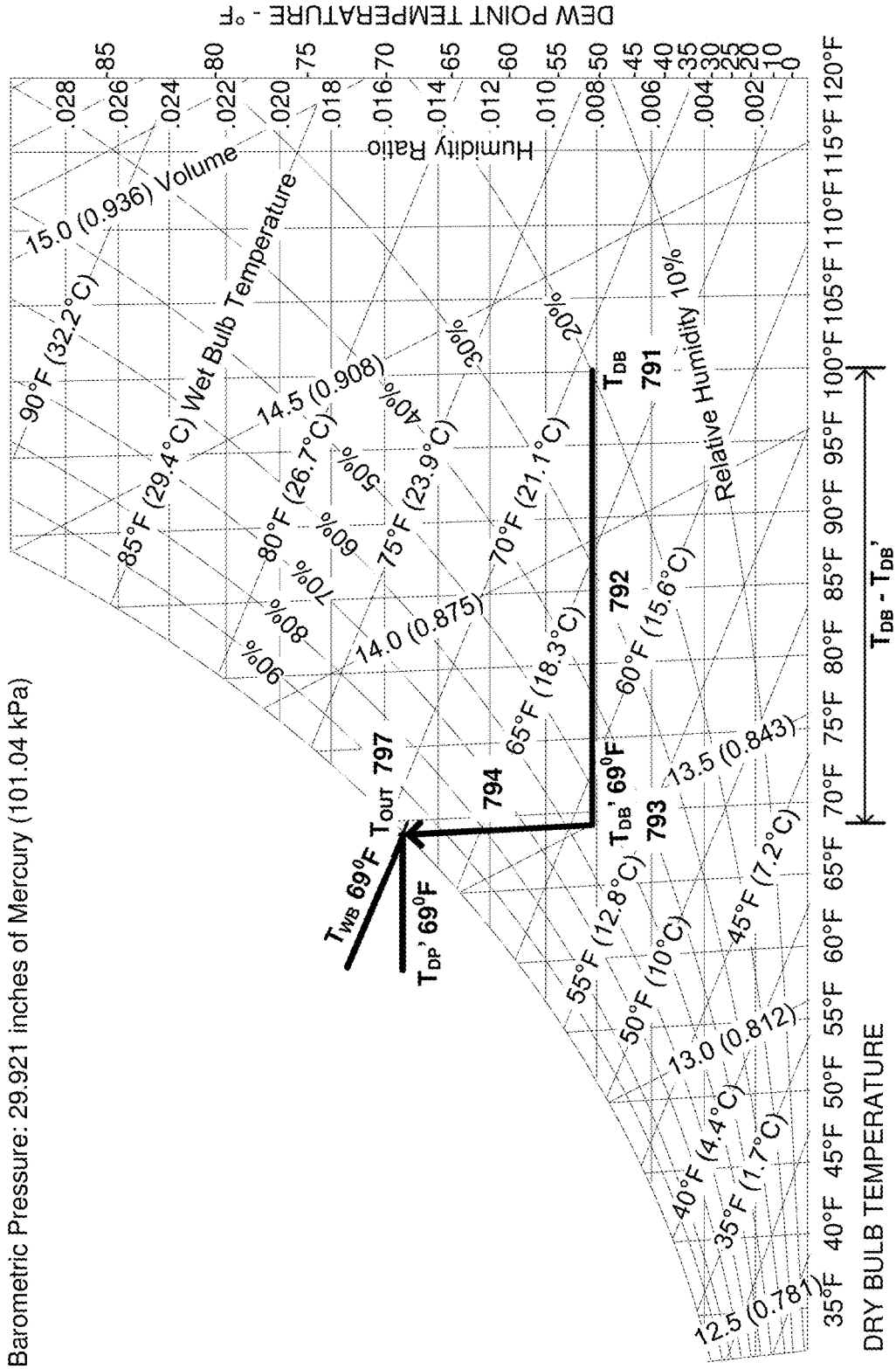
FIG. 7 – Final Convergence Predicted by an Idealized Cycle Model

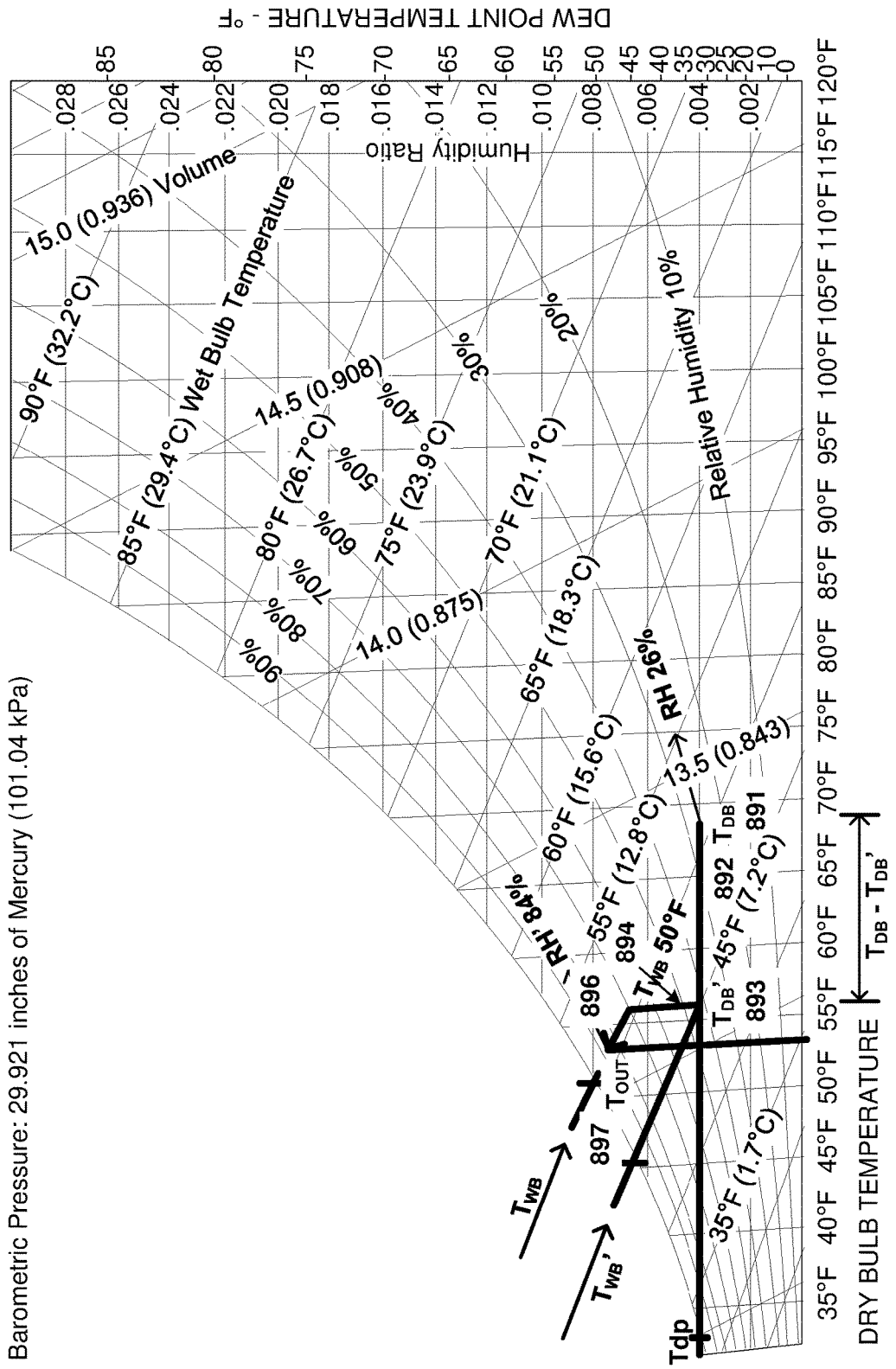
FIG. 8 – Prototype Data Plot

SERVOCOOL WATER EVAPORATIVE REFRIGERATION CYCLE

CROSS-REFERENCE

This application claims priority to and the benefit of U.S. Provisional Application No. 63/062,133, titled "ServoCool Water Evaporative Refrigeration Cycle", filed 6 Aug. 2020. The priority application is incorporated by reference herein for all purposes.

BACKGROUND

This background section introduces the technology disclosed, in terms familiar in the art of cooling, and should not be taken as a description of the prior art.

The technology disclosed is a two stage Indirect/Direct Evaporative Cooling (IDEC) cycle whose novel closed loop topology compels system convergence to a stable operating state, wherein air cooling takes place mostly in the indirect stage. The direct stage then serves principally as a water chiller.

In converged operation, a prototype exhibited robust parametric performance, which is one attribute of systems based on closed loop control principles. The prototype output cooled product air to typically 88% relative humidity over a broad range of load and atmospheric conditions, outperforming other IDEC architectures.

Changes in air mass loading or atmospheric conditions have nominal impact on the cooling process. Enhanced by positive feedback, system performance exceeds the specifications of the individual components, resulting in advantages in the size and cost of implementation.

Graphical psychrometric representations of the cycle processes are definitive, and distinguish the technology disclosed from other art.

BRIEF DESCRIPTION OF THE FIGURES

FIG. 1A is a simplified diagram of an apparatus for a two-stage evaporative cooling, with two variations on isolation of the cooled air from other components.

FIG. 2 is a psychrometric chart illustrating thermodynamic parameters of the ServoCool system at startup.

FIG. 3 is a simplified psychrometric chart illustrating thermodynamic parameters of the ServoCool system some tens of seconds after the startup.

FIG. 4 is a simplified psychrometric chart illustrating the thermodynamic parameters of the ServoCool system when the heat exchanger becomes more effective.

FIG. 5 is a simplified psychrometric chart illustrating the thermodynamic parameters of the ServoCool system with a medium high load factor.

FIG. 6 is a simplified psychrometric chart illustrating the thermodynamic parameters of the ServoCool system with a high load factor.

FIG. 7 is a simplified psychrometric chart illustrating the thermodynamic parameters of the ServoCool system predicted by an example idealized cycle model.

FIG. 8 is a simplified psychrometric chart illustrating the thermodynamic parameters of the ServoCool system based on actual observed data from a prototype device.

DETAILED DESCRIPTION

The Method

Figure 1B:
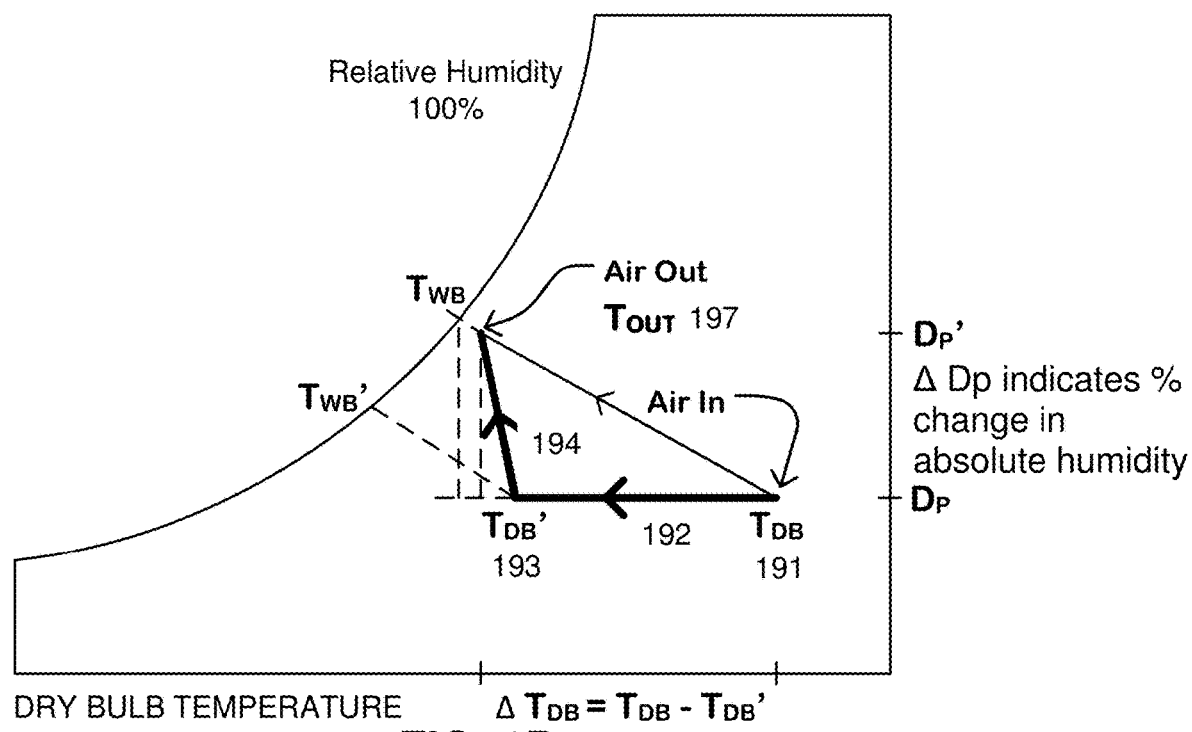
FIG. 1B is a simplified ServoCool psychrometric representation showing converged operation.

A cold water generator and a cold air generator are arranged to enhance each other's function by positive feedback. Their mutually regenerative connection causes the process cycle to chill system water and air flows to near the ambient wet bulb temperature. When product air is cooled to near the evaporative limit in the first stage heat exchanger, little potential for further evaporative cooling remains, except to re-chill cooling water. While cooling of the product air is predominantly sensible, at the heat exchanger, the overall cycle is considered adiabatic.

The Apparatus

The ServoCool cycle includes arrangement of an evaporative (cold air/water) cooler following in series after a water-based indirect cooling (cold air/warm water) heat exchanger and isolating their serially connected flows of air and cooling feed water. This coupling of the two stages' air and water flows forms a positive feedback loop which causes their processes to converge towards an ambient wet bulb temperature, producing highly effective evaporative cooling. The first stage cools the incoming air and warms the cold water from the chiller. Both the chilling of the air and the warming of water improve performance of the downstream output evaporative cooling stage. The second stage evaporative cooler progressively chills and re-chills the cooling water used by the heat exchanger, completing the feedback loop. A convergence occurs when the stages are unable to enhance each other further, near the ambient wet bulb temperature $T_{WB}$.

Air and water flows are driven by a fan and a pump with a reservoir. The reservoir is also sometimes referred to as a sump or a chilled water tray. Water from the cold water generator is drawn from the sump and routed through the indirect heat exchanger, then to the water distribution manifold and emitters in a chiller. Below evaporative media of the chiller, cooled water is collected in the insulated sump.

Thus, sensible heat is transferred from the input air by the heat exchanger, indirect stage, to cooling water and transported via water flow to the evaporative cooler, direct stage, where evaporation transfers it into the processed air as latent heat. The water flow rate required to transport that heat from the input stage to the output is on the order of 200 times the rate of evaporation (and replenishment.)

The overall cycle and cooling by the second stage are isenthalpic processes; unsurprisingly, the stages' internal processes are not. The ambient $T_{WB}$ sets the lower temperature boundary of these processes, and, consequently, of the output.

FIG. 1A is a simplified diagram of two variations on an apparatus for two-stage evaporative cooling. An insulated 141 flow tunnel 100 contains a first stage heat exchanger 110, a second stage evaporative chiller 120, and a chilled water tray 130. The chilled water tray should be insulated, as shown in the bottom variation, but need not be isolated from the insulated flow tunnel, as shown in the top variation, at least at the base of the second stage chiller where it collects falling water. Intake air 101 can flow into the first stage heat exchanger 110 to be cooled, and the first stage heat exchanger 110 can produce chilled air 111. The chilled air 111 then flows through the insulated flow tunnel 100 to the second stage evaporative chiller 120. The second stage evaporative chiller 120 exhausts humidified chilled air 121.

Water from the chilled water tray 130 is circulated through the first stage heat exchanger 110, thereby transferring heat from the intake air 101 into the water, and producing warmed water 112. Warmed water 112 is then directly circulated to the second stage evaporative chiller 120. Warmed water 112 can be directly circulated to the second stage evaporative chiller 120 through a pump 113. The second stage evaporative chiller 120 produces chilled water 122, which is then collected, less evaporated water, in the chilled water tray 130. Chilled water in the chilled water tray 130 is then recirculated directly to the first stage heat exchanger 110.

In this application, as in the art, "air in" can also be referred to as "intake air" or "input air" or "input". "Air out" can also be referred to as "exhausted humidified chilled air" or "output air" or "output".

FIG. 1B is a simplified ServoCool psychrometric representation showing converged operation with the final air out temperature $T_{OUT}$ 197 approaching the original wet bulb temperature $T_{WB}$. Thermodynamic parameters used in psychrometric charts, including dry bulb temperature 191, 193 and wet bulb temperature, are explained in reference to FIG. 2. As used herein, cooling load refers to the rate at which sensible 192 and latent 194 heat must be removed from the space to maintain a constant space dry bulb air temperature and humidity. At convergence, the sump temperature settles very near $T_{WB}$ (~1° C. offset at full load). Cold water production and load are in balance, with $T_{DB}'$ 193 higher than $T_{WB}$, as indicated by a pair of the vertical dotted lines. The wet bulb temperature remains constant from input to output.

FIGS. 3-6 further illustrate lowering of the dry bulb temperature $T_{DB}$. Moving leftward to the final dry bulb temperature $T_{DB}'$ represents operation of the heat exchanger to cool the air. Increasing of the relative humidity at $T_{DB}'$ reflects evaporation of water. In FIG. 7, at convergence, the final dry bulb temperature $T_{DB}'$, the wet bulb temperature $T_{WB}$, the output temperature $T_{OUT}$, and the final dew point temperature $T_{DP}'$ can be approximately equal to each other.

Startup

A series of psychrometric charts in FIGS. 2-8 indicate expected and observed behaviors of the ServoCool system from startup to ideal steady state operation. Thermodynamic parameters shown in the psychrometric charts include dry bulb temperature, wet bulb temperature, dew point temperature, relative humidity, humidity ratio, specific enthalpy and specific volume. Lines and labels for the thermodynamic parameters in FIG. 2 are common with FIGS. 3-8. For legibility, the enthalpy scale, the dry bulb temperature scale in Celsius, the values for saturation temperature, and some of the parameter lines shown in FIG. 2 are omitted in FIGS. 3-8.

Dry bulb temperature ($T_{DB}$) is the temperature of air measured by a thermometer freely exposed to the air, but shielded from radiation and moisture. The term dry-bulb is added to temperature to distinguish it from wet-bulb temperature and dew point temperature. The dry bulb temperature scale is plotted as the horizontal axis at the base of a psychrometric chart. Constant dry bulb temperatures are shown by vertical lines in the psychrometric chart in FIGS. 2-8, for example, at intervals of 5° F. on the horizontal axis (35° F., 40° F., 45° F., . . . , 100° F., 105° F., 110° F., 115° F., 120° F.).

Wet bulb temperature ($T_{WB}$) is the lowest temperature that can be reached under current ambient conditions by the evaporation of water only. Wet bulb temperature reflects the cooling effect of evaporating water. The cooling effect of the evaporating water can cause a lower temperature compared to the dry bulb air temperature. Equal wet bulb temperatures are shown by sloping lines extending from the upper-left to the lower-right of the psychrometric chart in FIGS. 2-8, for example, at intervals of 5° F. (35° F., 40° F., 45° F., . . . , 70° F., 75° F., 80° F., 85° F., 90° F.).

Dew point temperature ($T_{DP}$) is the temperature where water vapor starts to condense out of the air. At the dew point temperature, air becomes completely saturated. Above the dew point temperature, the moisture stays in the air. Dew point temperatures are marked on a vertical axis at the right side of a psychrometric chart.

Relative humidity (RH) is a capacity ratio of how much moisture is present versus how much moisture the air could hold at a temperature. RH is dimensionless, and is usually expressed as a percentage. Equal relative RH values are shown by curves extending from the lower-left to the upper right of the psychrometric chart in FIGS. 2-8, for example, at intervals of 10% from 0% (dry air) to 100% (saturation).

Humidity ratio (HR) is a mass ratio of the mass of water vapor present per unit mass of dry air at the given conditions (dry bulb temperature, wet bulb temperature, dew point temperature, relative humidity, etc). For a given dry bulb temperature, there is a particular humidity ratio for which the air sample is at 100% relative humidity. Humidity ratio is plotted as the vertical axis of a psychrometric chart. The dimensionless humidity ratio is expressed as pounds moisture per pound of dry air in FIGS. 2-8, for example, at intervals of 0.02 pounds moisture per pound of dry air (0.002, 0.004, . . . , 0.026, 0.028).

Specific enthalpy is the sum of the internal heat energy of the moist air, including the heat energy of the air and water vapor within. Lines of constant specific enthalpy are parallel to lines of constant wet bulb temperature. Specific enthalpy is expressed as BTU (British Thermal Unit) per pound of dry air or kilo-joules per kilogram (kJ/kg) of dry air.

Specific volume is the volume of the mixture of dry air plus the water vapor containing one unit of mass of dry air. Specific volume is expressed as cubic feet per pound of dry air or cubic meters per kilogram ($M^3$/kg) of dry air.

FIG. 2 is a black and white rendition of a psychrometric chart illustrating the thermodynamic parameters of the ServoCool system at startup. (Sometimes, colors are used to make it easier to visually trace the many lines of the chart.) In the FIG. 2 example, at startup, the sump water is at the ambient dry bulb temperature $T_{DB}$ which is about 100° F. The wet bulb temperature $T_{WB}$ is about 60° F., the relative humidity RH is about 20%, and the dew point temperature is about 51° F. Initially, before convergence, of cooling of both air and water depends on evaporation as air passes through the second stage's wetted media, because the startup temperature of the water is the same as the input air temperature. During startup, the relative humidity resulting from stage two evaporation is generally does not exceed approximately 70%. The system moves from direct cooling into its indirect cooling mode as the circulating water chills. Favorably, the wet bulb temperature $T_{WB}'$ diminishes with decreasing dry bulb temperature $T_{DB}'$, enhancing evaporative efficiency in the second stage. The output air temperature is denoted $T_{OUT}$.

FIG. 3 is a simplified psychrometric chart illustrating the thermodynamic parameters of the ServoCool system some tens of seconds after the startup. As the circulating water cools due to second stage evaporative cooling, the heat exchanger in the first stage becomes effective. Progressive lowering of the resulting wet bulb temperature $T_{WB}'$, resulting from indirect cooling of input air, enhances performance of the second stage evaporative cooling. In FIG. 3, the cycle is illustrated in three segments. The first, horizontal segment 392 from the dry bulb temperature 100 degrees F. 391 moving leftward to 90 degrees 393 represents indirect cooling by the heat exchanger, which cools the air without altering the mass of water in the air. As indicated by the relative humidity curves sweeping from lower left to upper right, cooling of air reduces its capacity to hold water vapor and, therefore, increases the relative humidity from just under 20 percent at $T_{DB}=100°$ F. (ref 391) to about 27 percent at $T_{DB}'=90°$ F. (ref 393). The wet bulb temperature decreases by 3.5° F. from $T_{WB}=69°$ F. to $T_{WB}'=65.5°$ F. The second, vertical segment 394 reflects evaporation of water sufficient to bring the circulating water back to the temperature of the sump or slightly better. This evaporation increases the relative humidity from about 27 percent at $T_{DB}'=90°$ F. to about 35 percent at $T_{DB}'=90°$ F. Finally, the third, diagonal segment 396 from the dry bulb temperature 90 degrees to about 73.5 degrees indicate cooling of the air by direct evaporative cooling to $T_{OUT}$ 397. A vertical line from 397 to the x axis assists in reading the temperature of $T_{OUT}$ 397.

FIG. 4 is a simplified psychrometric chart illustrating the thermodynamic parameters of the ServoCool system when, approaching convergence, the heat exchanger becomes more effective. In FIG. 4, the cycle is illustrated in three segments. The first, horizontal segment $T_{DB}$-$T_{DB}'$ 492, extends from the dry bulb temperature 100 degrees F. 491 leftward to 80 degrees 493. This represents operation of the heat exchanger, which cools the air without altering the proportion of water in the air. This increases the relative humidity, indicated by the relative humidity curves sweeping from lower left to upper right, from just under 20 percent at $T_{DB}=100°$ F. (ref 491) to about 37 percent at $T_{DB}'=80°$ F. (ref 493). The wet bulb temperature of the interstage is lowered by 7° F. from $T_{WB}=69°$ F. to $T_{WB}'=62°$ F. The second, vertical segment 494 reflects evaporation of water sufficient to bring the circulating water back to the temperature of the sump or slightly better. The relative humidity increases from about 37 percent at $T_{DB}'=80°$ F. to about 57 percent at $T_{DB}'=80°$ F. Finally, the third, diagonal segment 496 from the dry bulb temperature 80 degrees to 72.5 degrees 497 indicates cooling of the air by evaporative cooling. At this point in settling of the system, two thirds of cooling of the air is indirect, at the heat exchanger, and just under one-third results from direct evaporative cooling.

Convergence and Steady State

In operation, the feedback loop constantly drives the temperature of the water, and thus the indirect stage output $T_{DB}'$, towards the ambient wet bulb temperature. The precise amount of direct cooling potential, $T_{DB}'$-$T_{WB}'$, of the second stage depends on loading and losses/inefficiencies. In one implementation, the primary role of the evaporative second stage is to chill the water that flows to the indirect heat exchanger stage.

Thermal isolation helps the loop to converge usefully near $T_{WB}$. Without thermal isolation of system elements, the proportion of indirect cooling could vary widely with ambient conditions, and it may even be missing entirely. With thermal isolation and absent any inefficiency, the flows of the system except $T_{trans}$ would settle to the ambient wet bulb temperature of the input air; the input air would be cooled to the wet bulb temperature, by the first stage indirect cooling heat exchanger; and the cooling water would be re-chilled by second stage direct evaporative cooling. The change in air temp after the first stage of this example is 4.23 times greater than the change in water temperature, when the mass flows are equal, as the specific heat of water is 4.23 times greater than the specific heat of air.

FIG. 5 is a simplified psychrometric chart illustrating the thermodynamic parameters of the ServoCool system in an example with a medium high load factor. In practice a small residual cooling of air is expected, as illustrated by the short diagonal line 596 in FIG. 5, which indicates direct adiabatic cooling by 1.5 degrees, after indirect cooling by 27 degrees. A medium high load factor refers to large wet bulb depression with medium air and water mass rates. With a medium high load factor, the ambient dry bulb temperature $T_{DB}$ 591 is lowered to $T_{DB}'$ 593 by 27 degrees F. (100° F.-73° F.), the wet bulb temperature $T_{WB}$ is lowered to $T_{WB}'$ by 9 degrees F. (69° F.-60° F.), and the saturation (relative humidity) is about 87%.

Convergence is an equilibrium state. When the system water has cooled to $T_{WB}$, it cannot be chilled further by evaporative cooling in the process cycle, in the absence of a compressor. Cooling via the heat exchanger then depends on air and water flow rates and the difference between the air temperature (ambient dry bulb) and the chilling water temperature (approaching ambient wet bulb). Some inefficiency results in a converged $T_{DB}'$ that is slightly above the ambient $T_{WB}$. It should be understood that measurements of the parameters mentioned can be made from the intake and in water collected in the chilled water tray, among other positions.

FIG. 6 is a simplified psychrometric chart illustrating the thermodynamic parameters of the ServoCool system in an example with a high load factor. FIG. 6 illustrates a slight shift in expected operating characteristics when a high load factor is applied, as compared to FIG. 5. A high load factor refers to large wet bulb depression with high air and water mass rates. With a high load factor, the ambient dry bulb temperature $T_{DB}$ 691 is lowered 692 to $T_{DB}'$ 693 by 25 degrees F. (100° F.-75° F.), the wet bulb temperature $T_{WB}$ is lowered to $T_{WB}'$ by 8 degrees F. (69° F.-61° F.), the output temperature $T_{OUT}$ 697 is about 73° F., and the saturation (relative humidity) is about 84%. Of course, the examples of medium and high load factors are two points along a continuum.

The Idealized Cycle Model

FIG. 7 is a simplified psychrometric chart illustrating the thermodynamic parameters of the ServoCool system predicted for an example idealized cycle model. In an idealized example cycle model shown in FIG. 7, air cooling due to direct evaporation in the second stage is small, approaching zero, because the indirect cooling 792 pulled the air temperature close to the $T_{WB}$ of the intake air. The idealized cycle model predicts convergence at precisely the ambient wet bulb temperature $T_{WB}$, e.g., where the final output temperature $T_{OUT}$ 797, the ambient wet bulb temperature $T_{WB}$, and the final dew point temperature $T_{DP}'$ can be approximately equal to 69 degrees Fahrenheit. Lacking load modulated and static parasitic offsets, it indicates no direct cooling. Based on observations to date, it is estimated that cooling by a ServoCool cycle, in practice, will not quite reach $T_{WB}$ but will converge within 0.5 or 1.0 or 1.5 or 2.0 or 2.5 or 3.0 degrees Fahrenheit of $T_{WB}$. Prototype convergence results reported below, in the following section, were within 3.5 degrees Fahrenheit of $T_{WB}$. This included cooling by the heat exchanger to within 5.0 degrees Fahrenheit of $T_{WB}$. The final convergence will vary with implementation details.

Prototype Performance

FIG. 8 is a simplified psychrometric chart illustrating the thermodynamic parameters of the ServoCool system based on actual observed data from a prototype device. A prototype device has been built and observed, albeit under a limited range of operating conditions. Actual observed data is depicted in FIG. 8. The graph indicates an initial $T_{WB}$ 51 degrees F., $T_{DB}$ 68.5 degrees F. (ref 891), initial relative humidity RH 26 percent and final relative humidity RH' 84 percent. Removal of sensible heat 892 by the heat exchanger cools the interstage air temperature $T_{DB}'$ to 56 degrees F. (ref 893). The output air reaches 894, 896 $T_{OUT}$ of 53 degrees F. (ref 897). The conditions at intake and exhaust were measured using a hygrometer placed on a tripod. Thermocouples were used to measure the temperature of the cooling tray and between stages.

Operating conditions for this prototype device included: 14 v all three channels, 365 watts, 3.9 BTU/lb. air enthalpy change, 2000 CFM=162 lb/min, 37,900 BTU/hr, EER=103.8. Here EER means energy efficiency ratio, which is the ratio of the cooling capacity in BTU per hour to the power input in watts.

General Operating Conditions

Startup: The gain of the first stage, $\alpha$, is always less than unity. $\beta$, the gain of the second stage, is very high when the water is above $T_{WB}$. The reservoir is forced to $T_{WB}$ after several passes through the system, at either startup or following a disturbance in cooling operation. The loop gain is $\beta \times \alpha$, and is greater than unity until the reservoir reaches $T_{WB}$.

Converged state: Water supplied to the first stage is regulated to $T_{WB}$; $\beta=1$ and the loop gain is $\alpha$. By the exchanger's design, $\alpha$ is maximized at equal mass flows and is proportional to the flows' temperature difference, $T_{DB}-T_{WB}=T_\lambda$, the wet bulb depressor Let $\alpha=kT_\lambda$ k is constant for a specific equal mass flow rate:

$$T_{DB}' \sim T_{DB} - \alpha(T_{DB} - T_{WB})$$

$$T_{DB}' \sim T_{DB} - kT_\lambda(T_\lambda) = T_{DB} - kT_\lambda^2$$

This means $T_{DB}'$ convergence improves by the square of an increase in $T_\lambda$, the wet bulb depression. Exchanger efficiency/gain improves in dry climates, increasing the BTU of cooling for the same power consumed. $T_{db}'$ will make its closest approach to $T_{wb}$ in the driest conditions, yielding the highest performance margins for $T_{db}'$ in residential comfort designs such as FIG. 10.

Feedback, Gain, and Convergence in the Heat Flow Model

Figure 9:
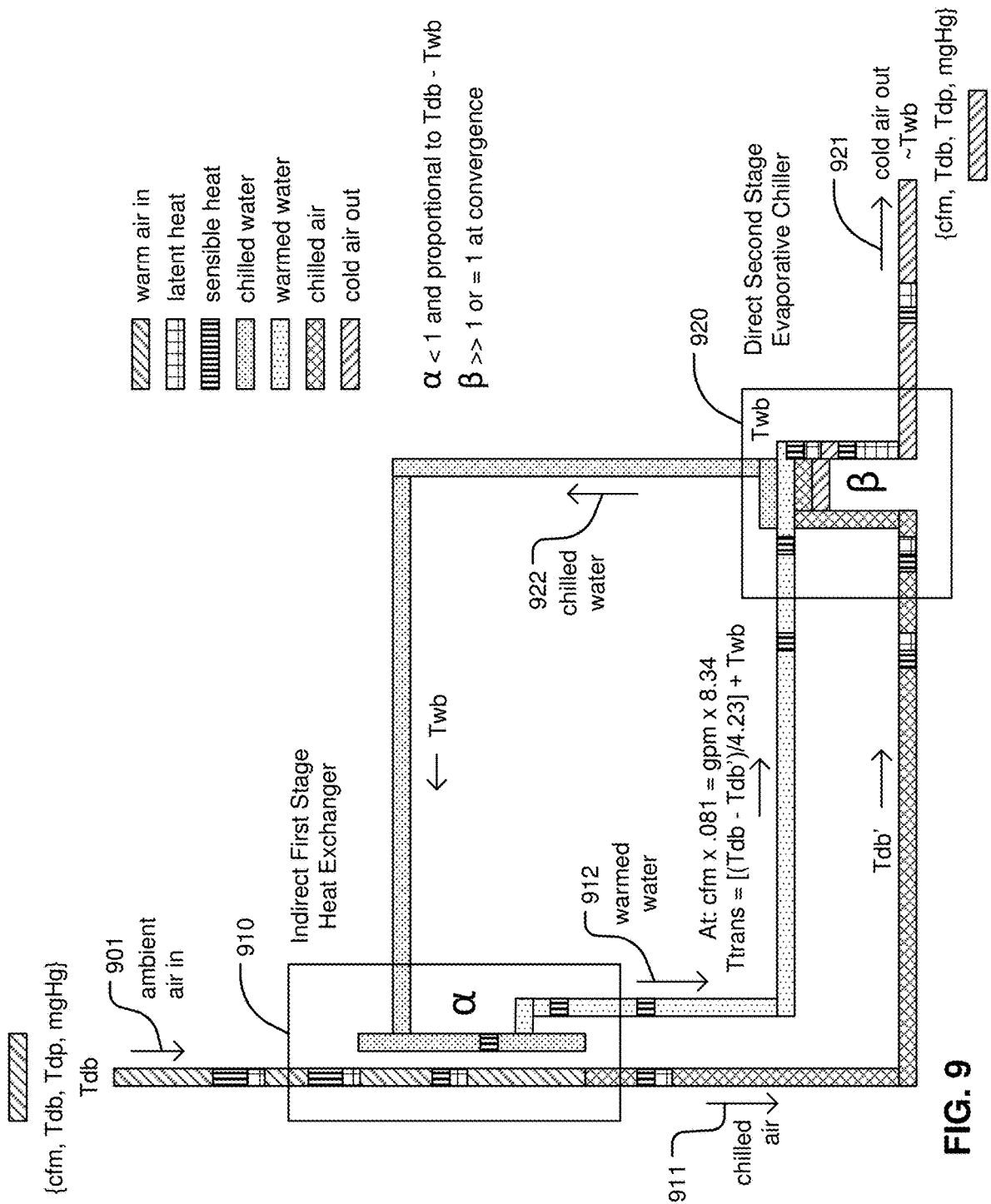
FIG. 9 illustrates a ServoCool cycle heat flow model.

FIG. 9 focuses on illustrating cooling water circulation and air flow in a ServoCool cycle heat flow model, using a two-stage evaporative cooling method. Sizing of the fluid paths for water and air is not to scale in this figure. In this model, intake air 901 is drawn into an insulated flow tunnel (100, FIG. 1) that contains a first stage heat exchanger 910, a second stage water-air evaporative chiller 920 and a chilled water tray (130, FIG. 1). The intake air 901 flows through the heat exchanger 910 to cool the intake air and produce chilled air 911. The chilled air 911 then flows through the insulated flow tunnel to the water-air chiller which produces exhausted humidified chilled air 921. "Intake air" can also be referred to as "air in" or "input". "Exhausted humidified chilled air" is also sometimes referred to as "air out" or "output".

Water is circulated through the first stage heat exchanger 910, thereby transferring heat from the intake air 901 into the water, then directly to the second stage water-air evaporative chiller 920, to produce chilled water 922. The chilled water 922 is collected, less evaporated water, in the chilled water tray (130, FIG. 1), and recirculated directly to the heat exchanger 910.

Positive feedback interaction between the first stage heat exchanger 910 and the second stage water-air evaporative chiller 920 causes convergence of the temperature of water in the chilled water tray to within a range of 0.5 to 5.0 degrees Fahrenheit of the wet bulb temperature of the intake air, $T_{WB}$. In implementations, the range can be 1.0 to 4.5, or 1.5 to 4.0, or 2.5 to 3.6, or 4.0 to 5.0 degrees Fahrenheit.

Water has roughly three thousand times the energy capacity by volume compared to air, due to differences in both density and specific heat. A one inch water hose is the equivalent in that respect of an air duct with 16 ft/sq. of cross section. This ServoCool model shows that the entire mutual feedback path of the cycle utilizes water. Feedback from the chiller to the exchanger is expressed in the difference between the chilled water temperature and $T_{DB}$; return feedback to the chiller is expressed equivalently in the temperature offset of the warmed water to $T_{WB}$ and in the temperature offset of the chilled air to $T_{DB}$. At equal mass flows, the air temperature will change 4.23 times as much as the water temperature, since this is the ratio of their respective specific heat values.

Persistent mutual feedback between stages is the fundamental driver of convergence. The overall gain is greater than one when water can be chilled further. Mutual gain greater than unity in this positive feedback loop finds a bounding value, as the gain of the chiller goes to one, so the water temperature converges to $T_{WB}$.

At convergence, the ratio of indirect to direct cooling depends on the properties of the first stage heat exchanger.

Proportion of Direct to Indirect Cooling

The water/air exchanger used in the ServoCool prototype was of a design that is most efficient at equal air and water mass flows. Data taken at equal mass flows reflect this particular exchanger's efficiency in the ratio of indirect to direct cooling shown in a psychrometric graph. This ratio can therefore be altered by component selection/design. Doubling the surface area of the exchanger core without changing either air or water mass flow is one example of how the proportion of indirect cooling may be biased for application purposes (to the advantage of output cooling and power efficiency, but to the detriment of cost efficiency, in this example.) The proportion of indirect cooling can also be influenced by unbalancing the mass flows.

Features of ServoCool

Some or all of the following features can be used with a system that practices the technology disclosed.

A purposeful arrangement of IDEC components to form a strong mutual feedback loop which results in system temperatures being forced toward a local physical constant, $T_{WB}$.

Appropriate insulation of system components to maintain the feedback relationship by eliminating thermal crosstalk or leakage that would diminish that relationship.

A converged operating state where water is supplied at temperatures very near $T_{WB}$ to the indirect first stage over a system's specified load range. To a first order in the converged state, that range is defined by the capacity of the second stage evaporative media.

A water mass flow sufficient to transport the entire heat load of the system, a flow on the order of 200 times the amount consumed by evaporation.

Very high power efficiency (BTU per hour per watt) and cooling/saturation efficiency (% RH, % wet bulb depression) over that load range.

Isenthalpic from input to output. No water is consumed without providing evaporative cooling. The fan moves only product air. In an application where the occupied space is the $T_{WB}'$ region of the apparatus, as in FIG. 10, air exiting that space is the cold saturated output of the complete cycle, and remains useful. An example of regeneration here would be a fan boosted flow to and from the space, through an air heat exchanger placed in the exit air flow. Another example use is shown in the figure, where the output is used to cool an adjacent space before exiting the building Operational Boundaries Mass Flow The ServoCool prototype was constructed of easily sourced commercial products that can be selected for cost and form factor as well as performance. Its first stage heat exchanger was one that has been marketed towards residential HVAC application, and is designed for maximum heat transfer when the air and water mass flow rates through it are equal. Since exchanger designs with other optimum flow ratios could be used, ServoCool is not limited to matched air and water mass flows. Rather, the water mass flow is scaled to potentially carry up to 100% of the heat that will be converted from sensible to latent through evaporation. This is shown in the idealized model.

Alternatively, the system's mass flow can be expressed as a ratio of water mass flow to the evaporation rate, which is designed to be 200:1 in the prototype at 1500CFM and 13.7 GPM. A range from 50:1 to 400:1 is disclosed. At a 50:1 ratio or lower, there not expected to be sufficient heat flow from the first stage to the second to realize fully the potential advantage of positive feedback. Doubling the ratio to 400:1 or greater degrades the system efficiency due to pump energy consumption without corresponding benefit. By convention, CFM or cfm means cubic feet per minute, and GPM or gpm means gallons per minute.

Exhausted Air Relative Humidity

The ServoCool, at least when the two stages are tightly coupled (compare, prototype to FIG. 10, below), produces an exhaust relative humidity between 83 and 94 percent. The air exhausted from the prototype was measured at between 84 and 90 percent. Under low air mass flows, the air exhausted from the prototype reached at higher relative humidity of 94 percent. The heavy-duty application of the cycle is estimated to produce a relative humidity of 83 percent, in the graph above. With refinement, the relative humidity of air exhausted from the water chiller stage is projected to rise as high as 94 percent. Expressed as a range, the relative humidity of exhausted air can be in a range of 83 to 94 percent, or 83 to 92 percent or 83 to 90 percent or 83 to 87 percent.

Figure 10:
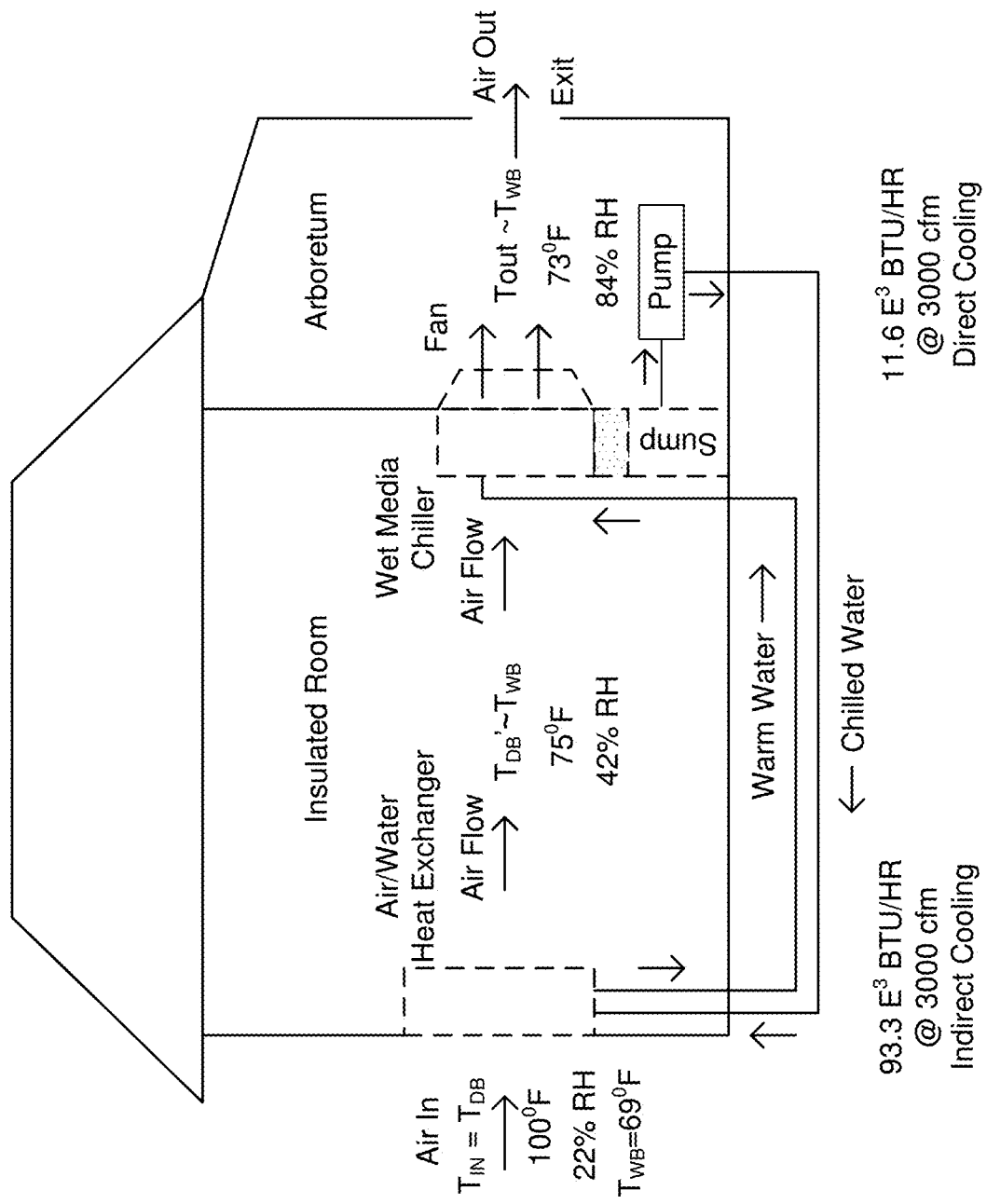
FIG. 10 illustrates an example residential comfort zone design using the present technology.

A relative humidity range of exhausted air has not been determined for the configuration depicted in FIG. 10, in which a room between cooling stages one and two is cooled and warms the interstage air. In the absence of direct observation, the relative humidity ranges above are expected to hold.

Ambient Conditions

At moderate dew point conditions, the prototype's output saturation is highest when wet bulb depression, wbd, is small. In these conditions, output saturation is better than 90% over the variation in mass air flow with 10 degrees wbd, and drops as low as 84% when wbd is 30 degrees and air/BTU are at maximum. It is considered likely that further saturation of moist, warm air (e.g. 80% RH), to near 90% RH will occur at high dew point. For residential applications, a wet bulb temperature of 75 degrees is a practical application limit for a ServoCooler, for the comfort of occupants. Industrial applications will not necessarily be sensitive to RH. In some industrial applications, a very high relative humidity may be desirable. Operation at lower than standard barometric pressure should shift operating temperatures predictably without altering principles of operation.

Advanced Hybrid Coolers

ServoCool is half of a pair of complimentary cycles conceived to provide atmospheric cooling and humidity control over the practical range of ambient conditions. Its doppelganger, the Ottocool cycle, is a direct compression cooling method which cools sensibly by compressing product air to a high temperature, extracting heat via the thermal gradient vs. ambient temperature, then expanding it back to its original volume. This is accomplished in one continuous and repetitive sequence, through the use of an Otto cycle pump apparatus, to produce a cooled air stream. The cycle can be calibrated to sensibly cool air below its dew point, delivering cool water as a byproduct for use in a preceding or subsequent stage.

Hybrid designs are possible using both cycles in sequence or Ottocool stages in series. Multi cylinder Otto pumps can be employed to realize multiple stages in one assembly. Such combinations can be used in fixed configuration for specific applications, or they can be designed to sense and adapt to ambient conditions and demand. In a humid environment, with a high dew point, a series configuration could use an Ottocool stage to cool the product air and remove much of the water; further cooling and humidity control by a ServoCool second stage using some of the water recovered by the first stage. In a dry climate, the order would be reversed. Repetitive Ottocool stages may be used to cool air sensibly to very low temperatures as required.

Convergence

A ServoCool cycle, in practical application, will not quite reach $T_{WB}$ but will converge within a lower bound of 0.5 or 1.0 or 1.5 or 2.0 or 2.5 or 3.0 degrees Fahrenheit of $T_{WB}$, as measured by a thermocouple in the cooling water tray An upper bound that distinguishes ServoCool cycle from other systems that cool without a compressor is within 3.6 or 4.0 or 4.5 or 5.0 degrees Fahrenheit of $T_{WB}$. These lower and upper performance bounds can be expressed directly as ranges that combine a lower and an upper bound, such as 0.5 to 5.0 or 1.0 to 4.5 or 1.5 to 4.0 degrees Fahrenheit of $T_{WB}$. Other example ranges are 2.5 to 3.6 or 4.0 or 4.5 or 5.0 degrees Fahrenheit of $T_{WB}$. Again, prototype convergence reported below was within 3.5 degrees Fahrenheit of $T_{WB}$, including cooling by the heat exchanger to within 5.0 degrees Fahrenheit of $T_{WB}$. The final convergence will vary with implementation details.

Applications

Applications for the ServoCool cycle include industrial and refining processes where high moisture content in product air is acceptable or even desirable and efficiency gains are profitable; unwanted moisture can also be reclaimed with industrial techniques at economies of scale. Product air with high moisture content is less likely to find acceptance when conditioning spaces meant for human habitation. Because $T_{DB}'$ can be brought close to $T_{WB}$ by the elimination of losses, optionally bringing the living space inside the process flow loop enables comfortable cooling to near $T_{WB}$, prior to the chiller. Then the higher humidity output of the chiller can be used to cool spaces less sensitive to moisture, or those that benefit.

FIG. 10 illustrates an example residential comfort zone design using the present technology. In this implementation, the heat exchanger and the water-air chiller are on opposite sides of an insulated room, such as in a home, a stadium or other building, and the air flows through the insulated room from the heat exchanger to the water-air chiller. Here, an example of that solution assumes insulation and sealing of the space, as it is to be incorporated into the servo loop. Except for the air and water mass flow, values are from the Hi Load Factor chart (FIG. 6), an extrapolation based on observations of the prototype at lower wet bulb depression. Pump and fan heat sources are shown bathed in output air from the chiller as in the prototype but could easily be located outside the dwelling. In FIG. 10, RH means relative humidity and HR means humidity ratio.

Prototype Described

Figure 11:
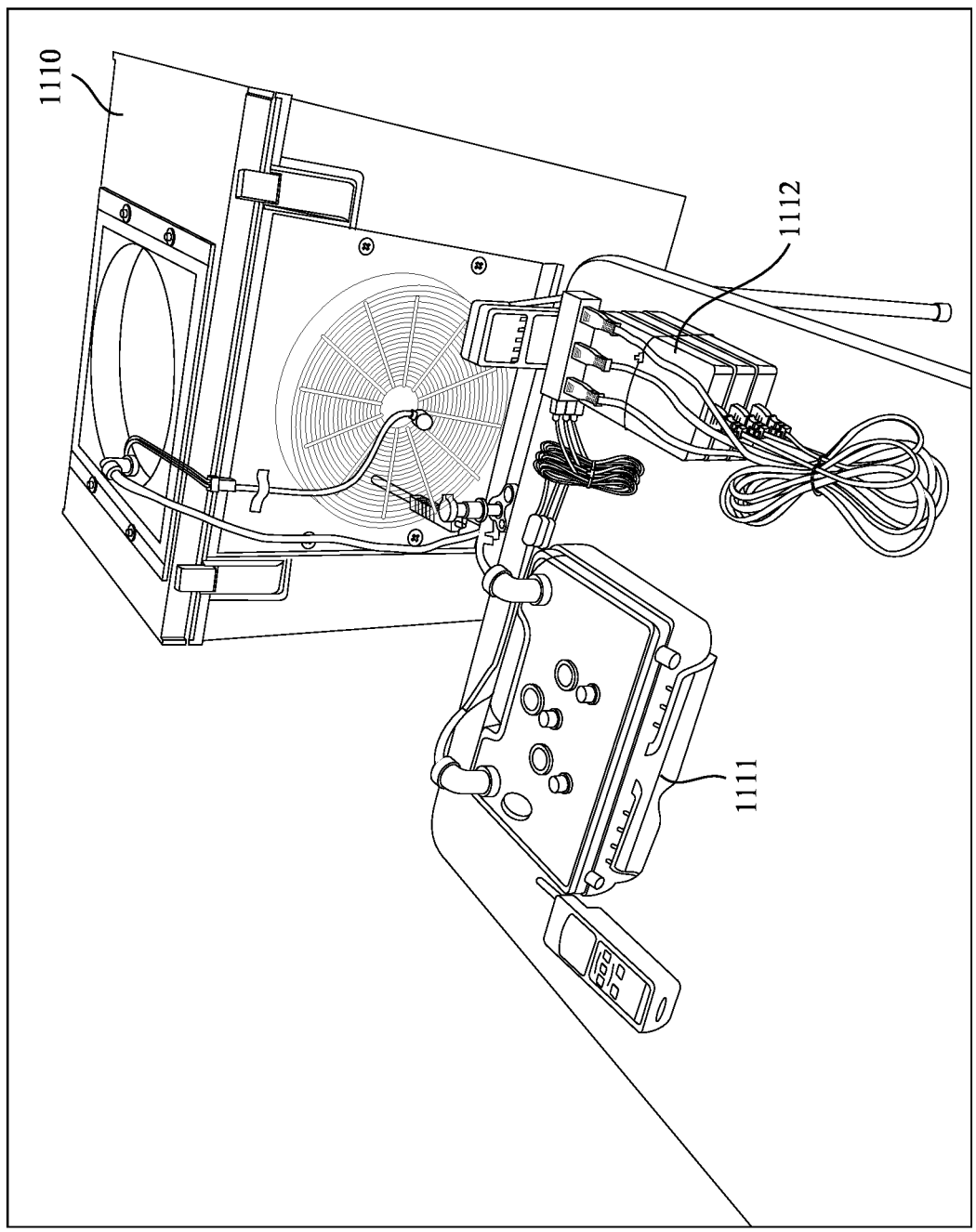
FIG. 11 illustrates a prototype with discrete three channel pwm (pulse width modulation) controller and 720 watt power supply.

FIG. 11 illustrates a prototype 1110 with a discrete three channel pwm (pulse width modulation) controller 1111 and 720 watt power supply 1112.

Figure 12:
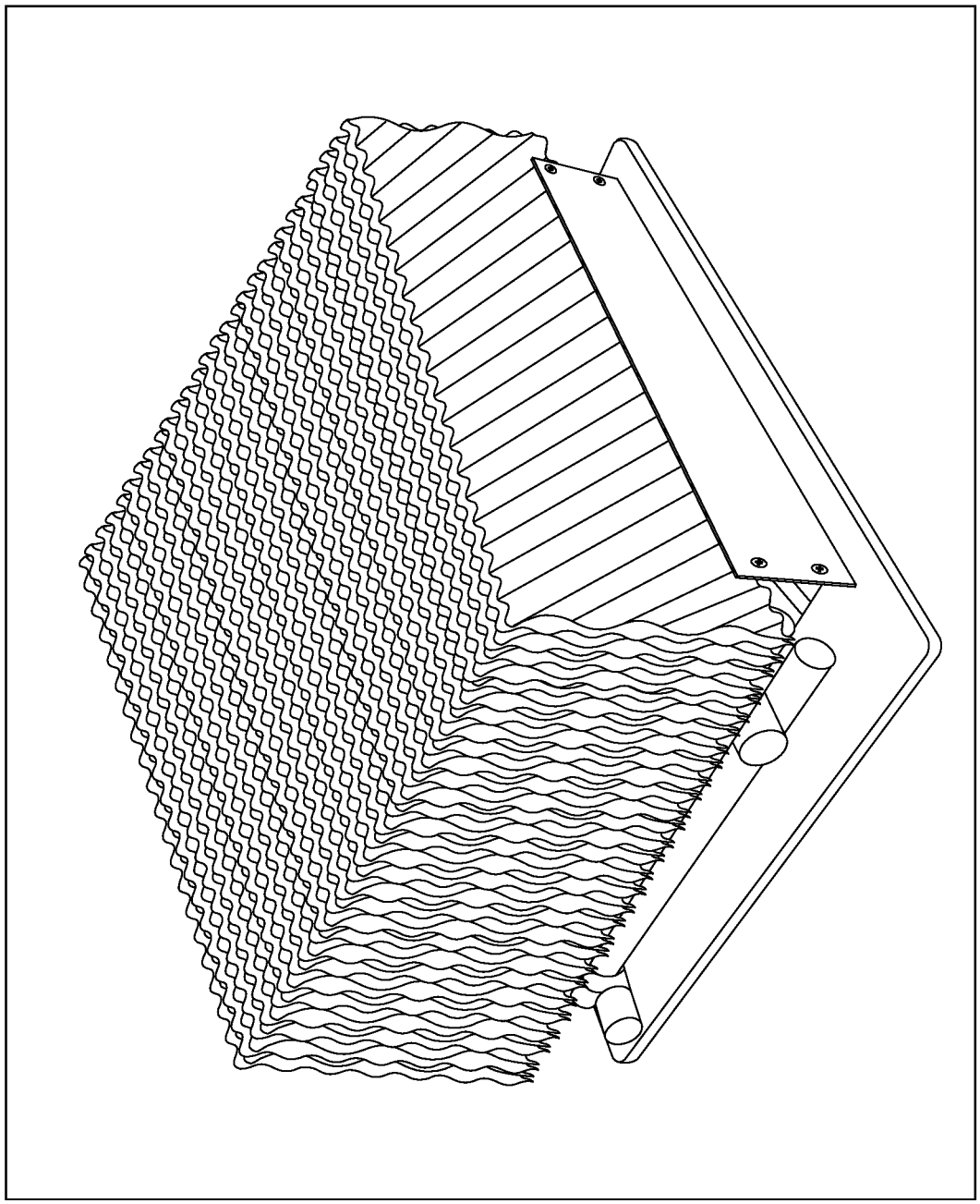
FIG. 12 illustrates a wet media core with heat exchanger and cabinet mounting flange.

FIG. 12 illustrates a wet media core with heat exchanger and cabinet mounting flange.

Figure 13:
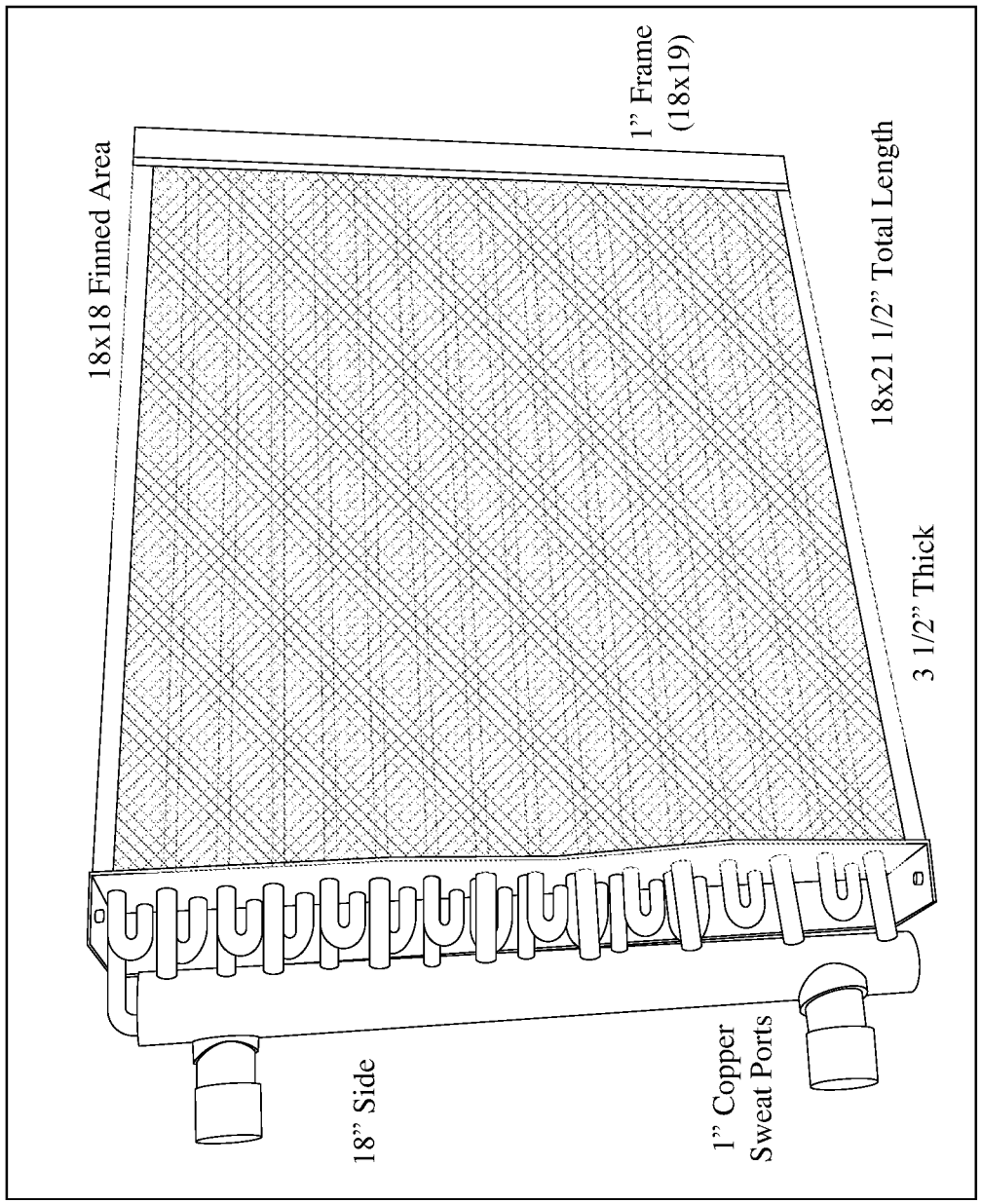
FIG. 13 illustrates a first stage air/water heat exchanger.

FIG. 13 illustrates a first stage air/water heat exchanger, at 129,000 BTU/hr @ 1500 cfm, 13.7 gpm, and 100-degree F. delta T.

Figure 14:
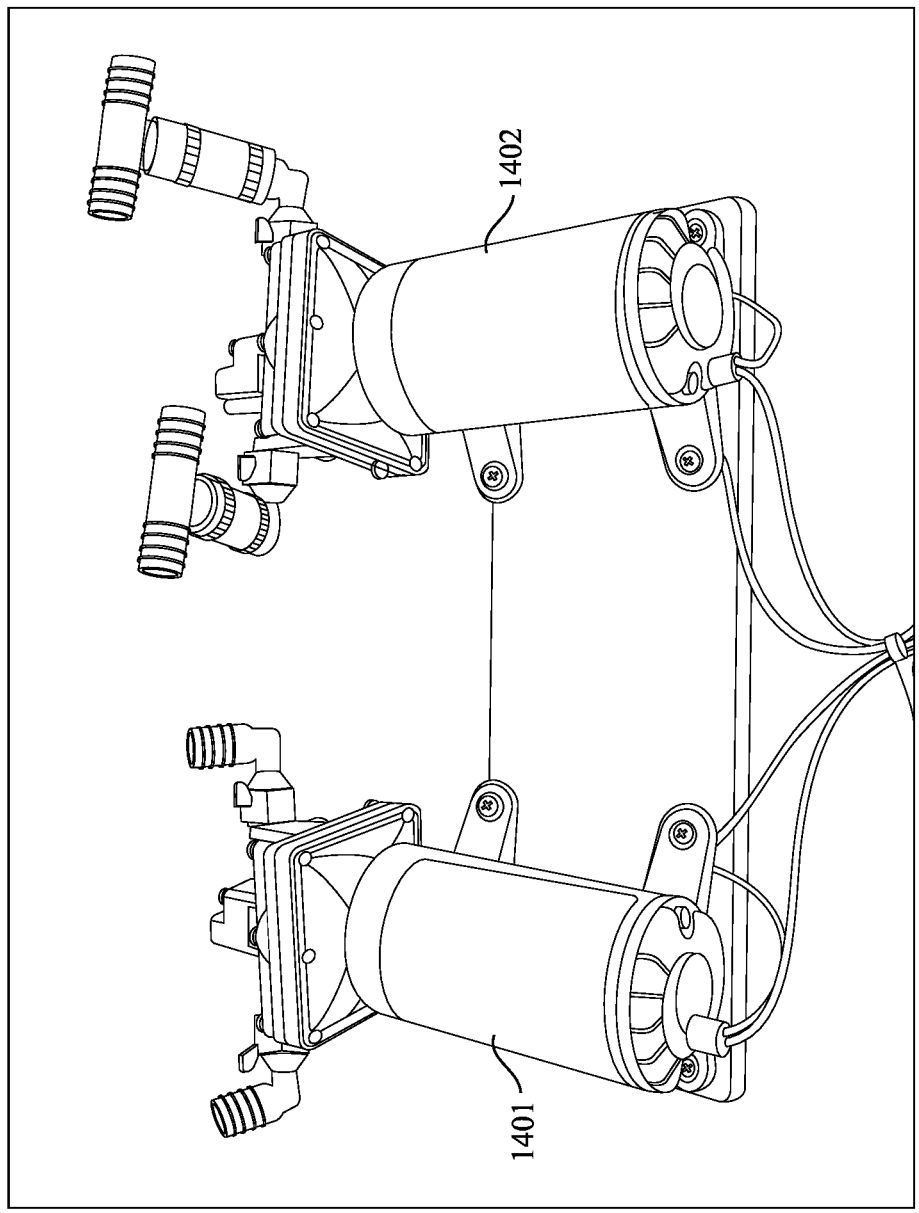
FIG. 14 illustrates diaphragm positive displacement pumps; in this example, 14 gpm @ 14V/225 watts.

FIG. 14 illustrates diaphragm positive displacement pumps 1401 and 1402; 14 gpm @ 14V/225 watts.

Figure 15:
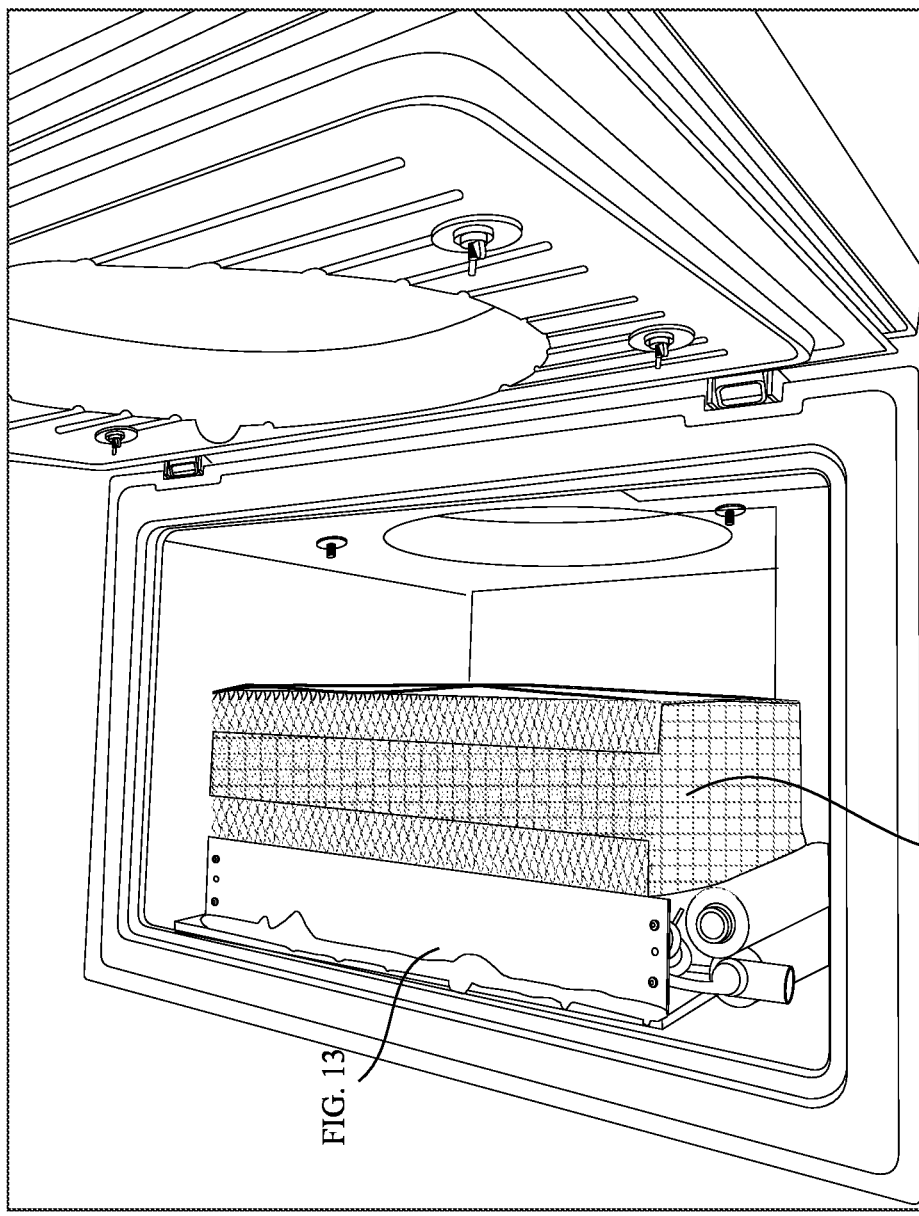
FIG. 15 illustrates a close embrace between first and second stages of the ServoCool prototype.

FIG. 15 illustrates a close embrace between cooling stages of the ServoCool prototype. The close coupling includes a heat exchanger as shown in FIG. 13 and a wet media core as shown in FIG. 12.

The ServoCool prototype (FIG. 11) is assembled in a seven cubic foot top loading freezer cabinet. This choice simplifies access, insulation, and sealing. It also provides the required insulated sump. The fan draws air from the cabinet, creating slight negative pressure and setting the top seal. Custom milled acrylic flanges are fastened internally and externally to provide hard points for mounting major components. The direct and indirect stages are fastened directly together (FIG. 15), forming a short, secure channel for $T_{WB}'$. The air channel length of the 18"×18" interface (FIG. 13) between the two stages is less than two inches. The lower several inches of the wet media (FIG. 12) extends into the reservoir. Air flows from the inlet port, through the heat exchanger (FIG. 13), and immediately through the 6" pass wet media (FIG. 12). This layout bathes the interior & components protectively in the second stage's air output, and only the warm water circuit from the first stage to the chiller benefits from further insulation. Power is supplied by a three-channel discrete pulse width modulated, pwm control system providing 240 watts per channel at 19 volts (FIG. 11). The three Alienware spec DC supplies give the system a 95% power factor correction figure and individual over current protection for each channel. A high flow pickup line in the sump carries water directly to the first stage heat exchanger (FIG. 13); the water is pulled by two parallel positive displacement pumps (FIG. 14) from the exchanger outlet side and directed through the water manifold to the emitters of the wet media second stage. The fan is specified for automotive radiator applications. It is unlikely that it moves anything like 3000 cfm at its rated 12.4 volts, where the measured dissipation is 111 Watts. At 14.2 volts, the power consumption rises to 150 watts. Supply chain research reveals a typical 225-watt ratting for 3000 cfm fans of this type, suggesting a derated figure of 2000 cfm for this example at 14.2 Volts. A 15-volt supply would bring the power dissipation to 225 watts. The paired diaphragm pumps (FIG. 14) deliver 14 gpm of water flow at 14 volts (measured), a rate of 3.5 tons per hour, consuming about 225 watts.

Bill of Materials for the Prototype
Cabinet Magic Chef 7 cu. Foot chest freezer HMCF7W3
Exchanger Badger Insulated Pipe 18"×18" Air/water heat xchgr
Fan A-Team Performance 16"/3000 CFM 180081 120 W @ 12.4V
Subframes TAP Plastics Custom acrylic component mount plates ×3
Pump Set SHURFLO High Flow Dual Pump System—12 VDC, 10.0 GPM
PWM DROK PWM DC Motor Speed Controller 10-50V 60 A ×3
Waterfall Derpras 8" Square Rain Shower Head×3
Wet Media Portacool PARKULCYC300 Kuul 3000 CFM media set
Power OOPS 240 W AC Adapter/Charger×3
MISC Various Tubing, fasteners, wiring, connectors Particular Implementations In one implementation, a two-stage evaporative cooling method is described. This method includes drawing air into an insulated flow tunnel that contains a heat exchanger, water-air chiller and chilled water tray. As described, insulated flow tunnel can be small or as large as a stadium. The method includes flowing the air through the heat exchanger to cool intake air and produce chilled air, then flowing the chilled air through the insulated flow tunnel to the water-air chiller and exhausting humidified chilled air. The water-air chiller primarily cools the water and secondarily produces additional cooling of the air flow. As for water flow, the method includes circulating water through the heat exchanger, thereby transferring heat from the intake air into the water, then directly to the water-air chiller, collecting the water, less evaporated water, in the chilled water tray, and recirculating the water directly to the heat exchanger.

Results of positive feedback interaction between the heat exchanger and the water-air chiller have been observed in prototypes and are reasonably expected to produce improved results after refinement. Positive feedback causes convergence of the temperature of water in the chilled water tray to within a range of 0.5 to 5.0 degrees Fahrenheit of the wet bulb temperature of the intake air, $T_{WB}$. The range may be narrower, such as 1.0 to 4.5, or 1.5 to 4.0, or 2.5 to 3.6, or 4.0 to 5.0 degrees Fahrenheit of $T_{WB}$. The range may between any of the stated lower bounds and any of the stated upper bounds.

This method and other implementations of the technology disclosed can include one or more of the following features and/or features described in connection with other methods disclosed. In the interest of conciseness, the combinations of features disclosed in this application are not individually enumerated and are not repeated with each base set of features. The reader will understand how features identified in this section can readily be combined with sets of base features.

The exhausted humidified chilled air can have an 83 to 94 percent relative humidity. This range could be lower, as low as 75 or 80 percent, if the air flow were increased relatively to the water flow. The upper end of the range could be higher, as high as 96 or 97 percent if the air flow were relatively decreased.

In some implementations, the circulation volume of the water through the water-air chiller is 100 to 400 times the water-air chiller evaporation volume. Make-up water that compensates for evaporation in the air-water cooler can be introduced most anywhere in the water circulation. Directly circulating water from the heat exchanger to the water-air chiller can include circulating it through a pump. The pump could be located elsewhere.

The water-air chiller can include one or more of a wet plate cooler, cellulose or plastic media, atomizers, plastic coated wire mesh (hardware cloth). Media used in the water-air chiller can generally be divided among atomizers and wet plates.

This technology can be applied when an available wet bulb deflection from dry bulb ambient is greater than or equal to 10 degrees.

Applied to a room scale unit, one implementation of the technology disclosed can have a circulation volume of 3000 cfm air (+/−20 percent) and 27.4 gpm (+/−20 percent), producing 93,000 BTUs (+/−20 percent) of sensible cooling. The air flow volume depends on the volume to be cooled.

In one implementation, the heat exchanger and the water-air chiller are on opposite sides of an insulated room, such as in a home, a stadium or other building, and the air flows through the insulated room from the heat exchanger to the water-air chiller, as shown in FIG. 10.

The technology disclosed includes systems practicing any of the preceding the methods and/or features.

The invention claimed is:

1. A two-stage evaporative cooling method, including:
drawing intake air into a heat exchanger, through an insulated flow path, then through a water-air chiller media, and collecting water from the media in a chilled water tray that is insulated;
wherein the heat exchanger and the water-air chiller media are on opposite sides of an insulated room that acts as part of the insulated path, such as in a home, a stadium or other building, and the air flows through the insulated room from the heat exchanger to the water-air chiller media;
flowing the intake air through the heat exchanger to cool intake air and produce chilled air, then flowing the chilled air through the insulated flow path to the water-air chiller and exhausting humidified chilled air; and
circulating water through the heat exchanger, thereby transferring heat from the intake air into the water, then directly to the water-air chiller, collecting the water, less evaporated water, in the chilled water tray, and recirculating the water directly to the heat exchanger;
wherein recirculating the water includes using a pump to circulate the water with a mass flow effective to produce positive feedback interaction between the heat exchanger and the water-air chiller operative to cause convergence of water temperature in the chilled water tray to within a range of 0.5 to 5.0 degrees Fahrenheit of the wet bulb temperature of the intake air, $T_{WB}$.

2. A two-stage evaporative cooling method, including:
drawing intake air into a heat exchanger, through an insulated flow path, then through a water-air chiller media, with and collecting water from the media in a chilled water tray that is insulated;
flowing the intake air through the heat exchanger to cool the intake air and produce chilled air, then flowing the chilled air through the insulated flow path to the water-air chiller and exhausting humidified chilled air; and
circulating water through the heat exchanger, thereby transferring heat from the intake air into the water, then directly to the water-air chiller, collecting the water, less evaporated water, in the chilled water tray, and recirculating the water directly to the heat exchanger;
wherein recirculating the water includes using a pump to circulate the water with a mass flow effective to produce positive feedback interaction between the heat exchanger and the water-air chiller and operative to cause convergence of water temperature in the chilled water tray to within a range of 0.5 to 5.0 degrees Fahrenheit of the wet bulb temperature of the intake air, $T_{WB}$.

3. The method of claim 2, wherein the range is 1.0 to 4.5 degrees Fahrenheit.

4. The method of claim 2, wherein the range is 1.5 to 4.0 degrees Fahrenheit.

5. The method of claim 2, wherein the range is 2.5 to 3.6 degrees Fahrenheit.

6. The method of claim 2, wherein the range is 4.0 to 5.0 degrees Fahrenheit.

7. The method of claim 2, wherein the exhausted humidified chilled air has an 83 to 94 percent relative humidity.

8. The method of claim 2, wherein circulation volume of the water through the water-air chiller is 100 to 400 times the water-air chiller evaporation volume.

9. The method of claim 2, directly circulating water from the heat exchanger to the water-air chiller through a pump.

10. The method of claim 2, wherein the water-air chiller includes one or more of a wet plate cooler, cellulose or plastic media, atomizers, plastic coated wire mesh (hardware cloth).

11. The method of claim 2, applied to a room scale unit, with a circulation volume of 3000 cfm air (+/−20 percent) and 27.4 gpm water (+/−20 percent) to produce 93,000 BTUs (+/−20 percent) of sensible cooling.

12. The method of claim 2, wherein the pump is a positive displacement pump.

13. The method of claim 12, wherein the evaporated water in the exhaust air increases the moisture content to approximately 180 percent by weight.

14. A system for a two-stage evaporative cooling, including:
an insulated flow path, an air intake, a heat exchanger positioned to cool intake air from the air intake, an air exhaust, a water-air chiller media positioned to chill water at the air exhaust, a circulating pump, and a chilled water tray that is insulated;
the heat exchanger coupled to receive circulating water from the chilled water tray, to produce chilled air and warmed water, as the chilled air flows through the insulated flow path to the water-air chiller;
the water-air chiller coupled to receive the warmed water from the heat exchanger, to produce chilled water, to produce additional cooling of the chilled air flowing from the heat exchanger, and to exhaust humidified chilled air;
the chilled water tray positioned to collect the chilled water, less evaporated water; and
the circulating pump circulates a mass of water that produces wherein a positive feedback interaction between the heat exchanger and the water-air chiller operative to cause convergence of water temperature in the chilled water tray to within a range of 0.5 to 5.0 degrees Fahrenheit of the wet bulb temperature of the intake air, $T_{WB}$.

15. The system of claim 14, wherein the range is 1.0 to 4.5 degrees Fahrenheit.

16. The system of claim 14, wherein the range is 1.5 to 4.0 degrees Fahrenheit.

17. The system of claim 14, wherein the range is 2.5 to 3.6 degrees Fahrenheit.

18. The system of claim 14, wherein the range is 4.0 to 5.0 degrees Fahrenheit.

19. The system of claim 14, wherein the exhausted humidified chilled air has an 83 to 94 percent relative humidity.

20. The system of claim 14, wherein circulation volume of the water through the water-air chiller is 100 to 400 times the evaporation volume of the water.

21. The system of claim 14, further including a pump to directly circulate the water from the heat exchanger to the water-air chiller.

22. The system of claim 14, wherein the water-air chiller includes one or more of a wet plate cooler, cellulose or plastic media, atomizers, plastic coated wire mesh (hardware cloth).

23. The system of claim 14, applied to a room scale unit, with a circulation volume of 3000 cfm air (+/−20 percent) and 27.4 gpm water (+/−20 percent) to produce 93,000 BTUs (+/−20 percent) of sensible cooling.

24. The system of claim 14, wherein the heat exchanger and the water-air chiller media are on opposite sides of an insulated room that acts as part of the insulated path, such as in a home, a stadium or other building, and the air flows through the insulated room from the heat exchanger to the water-air chiller.

* * * * *